United States Patent
Matsukawa et al.

(10) Patent No.: US 8,625,984 B2
(45) Date of Patent: Jan. 7, 2014

(54) TRANSMISSION DEVICE, CONTROL DEVICE, AND METHOD OF DETECTING ERRONEOUS CONNECTION OF SIGNAL LINE

(75) Inventors: Yoshinobu Matsukawa, Kawasaki (JP); Yuya Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 97 days.

(21) Appl. No.: 13/229,088

(22) Filed: Sep. 9, 2011

(65) Prior Publication Data
US 2012/0063766 A1 Mar. 15, 2012

(30) Foreign Application Priority Data
Sep. 14, 2010 (JP) ................................ 2010-205757

(51) Int. Cl.
*H04B 10/08* (2011.01)
(52) U.S. Cl.
USPC .................................. 398/24; 398/17; 398/22
(58) Field of Classification Search
USPC ........................................ 398/9–38, 202–214
See application file for complete search history.

(56) References Cited

U.S. PATENT DOCUMENTS

| | | | |
|---|---|---|---|
| 5,953,690 A * | 9/1999 | Lemon et al. .................. | 702/191 |
| 6,161,003 A * | 12/2000 | Lo Curto et al. .............. | 455/260 |
| 6,952,531 B2 * | 10/2005 | Aronson et al. ............... | 398/137 |
| 7,209,664 B1 * | 4/2007 | McNicol et al. .............. | 398/135 |
| 7,301,973 B2 * | 11/2007 | Shouji et al. .................... | 372/20 |
| 7,636,525 B1 * | 12/2009 | Bontu et al. .................... | 398/208 |
| 7,917,033 B2 * | 3/2011 | Sakata et al. .................... | 398/79 |
| 7,920,559 B2 * | 4/2011 | Shiota et al. ................... | 370/389 |
| 8,005,368 B2 * | 8/2011 | Roberts et al. ................. | 398/150 |
| 2002/0024696 A1 | 2/2002 | Maeda | |
| 2002/0145779 A1 * | 10/2002 | Strasser et al. ................. | 359/124 |
| 2007/0237521 A1 * | 10/2007 | Meyer et al. .................... | 398/19 |
| 2008/0170852 A1 * | 7/2008 | Santoro et al. .................. | 398/15 |
| 2009/0080906 A1 * | 3/2009 | Tao et al. ........................ | 398/209 |
| 2009/0297161 A1 * | 12/2009 | Ojima ............................ | 398/135 |
| 2010/0278528 A1 * | 11/2010 | Isomura et al. ................. | 398/25 |
| 2011/0249969 A1 * | 10/2011 | Ji et al. ............................ | 398/45 |
| 2011/0286746 A1 * | 11/2011 | Ji et al. ............................ | 398/83 |

FOREIGN PATENT DOCUMENTS

| | | |
|---|---|---|
| JP | 2001-358657 | 12/2001 |
| JP | 2002-44035 | 2/2002 |

* cited by examiner

*Primary Examiner* — Ken Vanderpuye
*Assistant Examiner* — Dibson Sanchez
(74) *Attorney, Agent, or Firm* — Staas & Halsey LLP

(57) ABSTRACT

A transmission device includes a transponder including an oscillator configured to oscillate a local optical laser, a wavelength controller configured to control an oscillation wavelength of the local optical laser to receive desired input signal light, and a coherent receiver configured to combine and detect the local optical laser and input signal light. A controller is configured to control the oscillation wavelength using a wavelength of the input signal light detected by the coherent receiver, to determine an erroneous connection of a signal line related to the input signal light, when the wavelength of the input signal light is not an expected wavelength.

7 Claims, 13 Drawing Sheets

TRANSMISSION DEVICE, CONTROL DEVICE, AND METHOD OF DETECTING ERRONEOUS CONNECTION OF SIGNAL LINE

CROSS-REFERENCE TO RELATED APPLICATION

This application is based upon and claims the benefit of priority of the prior Japanese Patent Application No. 2010-205757, filed on Sep. 14, 2010, the entire contents of which are incorporated herein by reference.

FIELD

The present invention relates to a transmission device, a control device, and a method of detecting the erroneous connection of a signal line.

BACKGROUND

In recent years, the wavelength division multiplexing (WDM) technology has been used in the field of an optical network, where the WDM technology allows a large capacity optical transmission to be achieved by performing wavelength division multiplexing for different wavelengths to transmit large-capacity data. According to the WDM technology, an optical add drop multiplexer (OADM) configured to add an optical signal with an arbitrary wavelength to a group of WDM signals and drop an optical signal with an arbitrary wavelength from the WDM signal group for reception is often used.

When an optical signal with another wavelength is added to the WDM signal group in an optical network including the OADM, the optical signal may not be transmitted successfully. Such situation is caused by, for example, deterioration of optical characteristics due to the transmission distance dependence, the dispersion characteristic of an optical fiber used to transmit the WDM signals, the erroneous setting of a wavelength route in the optical network, or the erroneous connection of an optical fiber.

According to an OADM conforming to Optical Transport Network (OTN), for example, the erroneous connection of an optical fiber is detected by referring to Source Access Point Identifier (SAPI) or Destination Access Point Identifier (DAPI) of an optical signal, which is included in Trail Trace Identifier (TTI) information provided in a frame.

Japanese Laid-open Patent Publication No. 2001-358657, Japanese Laid-open Patent Publication No. 2002-44035, etc. are disclosed as the related art.

SUMMARY

According to an aspect of the embodiment, a transmission device includes a transponder including an oscillator configured to oscillate a local optical laser, a wavelength controller configured to control an oscillation wavelength of the local optical laser to receive desired input signal light, and a coherent receiver configured to combine and detect the local optical laser and input signal light. A controller is configured to control the oscillation wavelength using a wavelength of the input signal light detected by the coherent receiver, to determine an erroneous connection of a signal line related to the input signal light, when the wavelength of the input signal light is not an expected wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The erroneous connection of the optical fiber is detected in the following manner, for example. Specifically, when the erroneous connection of the optical fiber occurs, an optical signal with a wavelength different from a wavelength which is originally to be input to a port (in other words, an optical connector) of the OADM is input to the port. Accordingly, a loss-of-light (LOL) signal is not detected. The OADM often uses a wide-band specification optical receiver (e.g., an optical electronic converter (O/E)) to receive a signal with every wavelength, which is to be included in the WDM signal group. Therefore, upon receiving an optical signal with a different wavelength, the OADM can receive the optical signal successfully and convert the optical signal into an electric signal. Therefore, a loss-of-signal (LOS) signal is not detected. Accordingly, the erroneous connection is detected by analyzing a frame indicated by the electric signal obtained by converting the received optical signal. Hereinafter, embodiments of the present invention will be described with reference to the attached drawings.

(1) Configuration

An exemplary configuration of a transmission system according to an embodiment will be described with reference to FIGS. 1, 2, and 3.

(1-1) Configuration of Transmission system

An exemplary configuration of a transmission system 1 according to an embodiment will be described with reference to a block diagram of FIG. 1.

Figure 1:
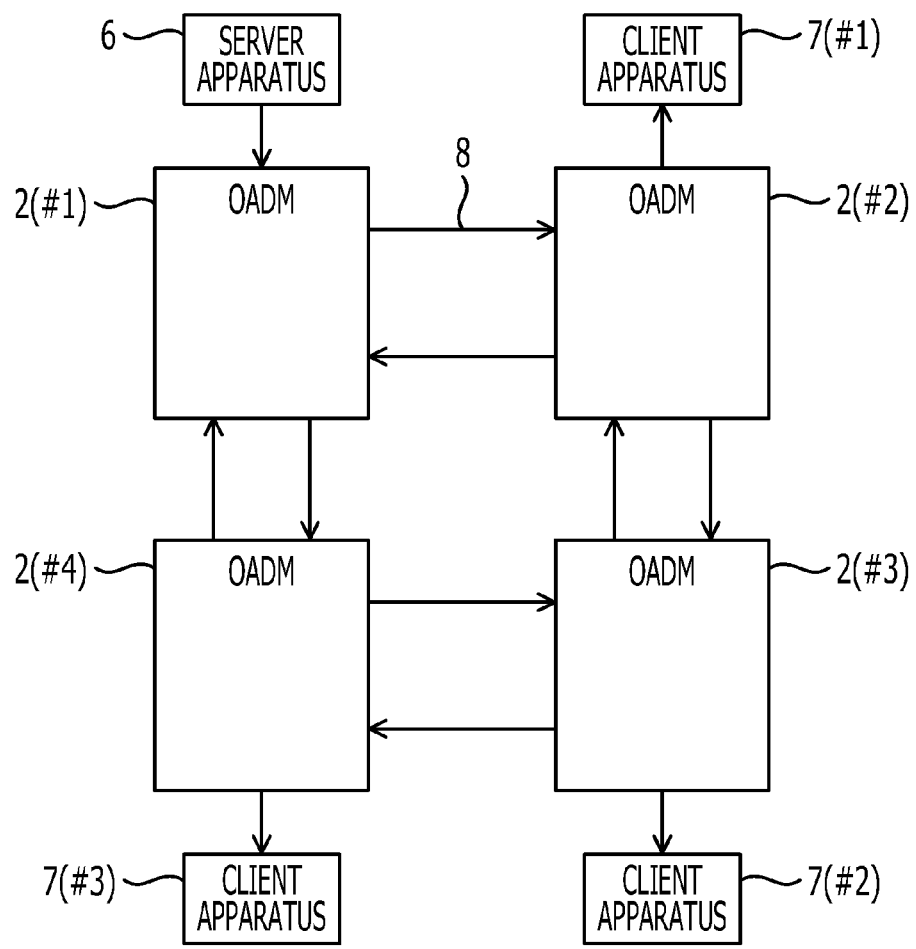
FIG. 1 is a block diagram illustrating an exemplary configuration of a transmission system according to an embodiment.

The transmission system 1 includes an optical add drop multiplexer (OADM) 2(#1), an OADM 2(#2), an OADM 2(#3), and an OADM 2(#4) as illustrated in FIG. 1. The OADMs 2(#1) to 2(#4) are coupled to one another with a ring network 8 including a bidirectional optical fiber, for example. Each of the OADMs 2(#1) to 2(#4) becomes a specific example of a "transmission device". Hereinafter, when the OADMs 2(#1) to 2(#4) are not particularly distinguished, the OADMs 2(#1) to 2(#4) are collectively referred to as an "OADM 2" for the sake of description.

The OADM 2(#1) is coupled to, for example, a server apparatus 6 functioning as the transfer source of a service signal. Therefore, the OADM 2(#1) converts a service signal output from the server apparatus 6 into an optical signal, and adds the optical signal to a group of WDM signals, which is transmitted via the ring network 8. More specifically, the OADM 2(#1) converts the service signal output from the server apparatus 6 into the optical signal corresponding to a single wavelength (a single channel) or several wavelengths (several channels), and adds the optical signal corresponding to the single wavelength to the WDM signal group corresponding to several tens of wavelengths (several tens of channels), which is transmitted via the ring network 8. The WDM signal group may include an optical signal having the same transmission capacity for every single wavelength or an optical signal having transmission capacities varying with every single wavelength. The transmission capacity may be, for example, 2.5 G, 10 G, or 40 G. The service signal may be, for example, an Optical Transport Network (OTN) signal, a SONET/SDH signal (OC3, OC12, OC48, OC192, STM1, STM4, STM16, STM 64, etc.), a packet signal (100 MbE, 1 GbE, 10 GbE, etc.).

The OADM 2(#2) is coupled to a client apparatus 7(#1) functioning as, for example, the transmission destination of the service signal. Likewise, the OADM 2(#3) is coupled to a client apparatus 7(#2) functioning as, for example, the transmission destination of the service signal. Likewise, the OADM 2(#4) is coupled to a client apparatus 7(#3) functioning as, for example, the transmission destination of the service signal. Therefore, the OADM 2(#2) drops an optical signal from the WDM signal group transmitted via the ring network 8, the optical signal including a service signal that is transmitted to the client apparatus 7(#1). The OADM 2(#2) converts the dropped optical signal into the service signal and transfers the service signal to the client apparatus 7(#1). More specifically, the OADM 2(#2) drops the optical signal corresponding to a single wavelength or several wavelengths, the optical signal including a service signal that is transmitted to the client apparatus 7(#1), from the WDM signal group corresponding to several tens of wavelengths, the WDM signal group being transmitted via the ring network 8. The OADM 2(#2) converts the dropped optical signal into a service signal and transfers the service signal to the client apparatus 7(#1). Likewise, the OADM 2(#3) drops an optical signal from the WDM signal group transmitted via the ring network 8, the optical signal including a service signal that is transmitted to the client apparatus 7(#2). The OADM 2(#3) converts the dropped optical signal into a service signal and transfers the service signal to the client apparatus 7(#2). More specifically, the OADM 2(#3) drops the optical signal corresponding to a single wavelength or several wavelengths, the optical signal including a service signal that is transmitted to the client apparatus 7(#2), from the WDM signal group corresponding to several tens of wavelengths, the WDM signal group being transmitted via the ring network 8. The OADM 2(#3) converts the dropped optical signal into a service signal, and transfers the service signal to the client apparatus 7(#2). The OADM 2(#4) drops an optical signal from the WDM signal group transmitted via the ring network 8, the optical signal including a service signal that is transmitted to the client apparatus 7(#3). The OADM 2(#4) converts the dropped optical signal into a service signal and transfers the service signal to the client apparatus 7(#3). More specifically, the OADM 2(#4) drops the optical signal corresponding to a single wavelength or several wavelengths, the optical signal including a service signal that is transmitted to the client apparatus 7(#3), from the WDM signal group corresponding to several tens of wavelengths, the WDM signal group being transmitted via the ring network 8. The OADM 2(#4) converts the dropped optical signal into a service signal, and transfers the service signal to the client apparatus 7(#3).

However, the server apparatus 6 may be the transmission destination of the service signal, or one or more of the client apparatuses 7(#1), (#2), and (#3) may be the transmission source of the service signal.

(1-2) Configuration of OADM

An exemplary configuration of the OADM 2 included in the transmission system 1 of the present embodiment will be described with reference to a block diagram of FIG. 2.

Figure 2:
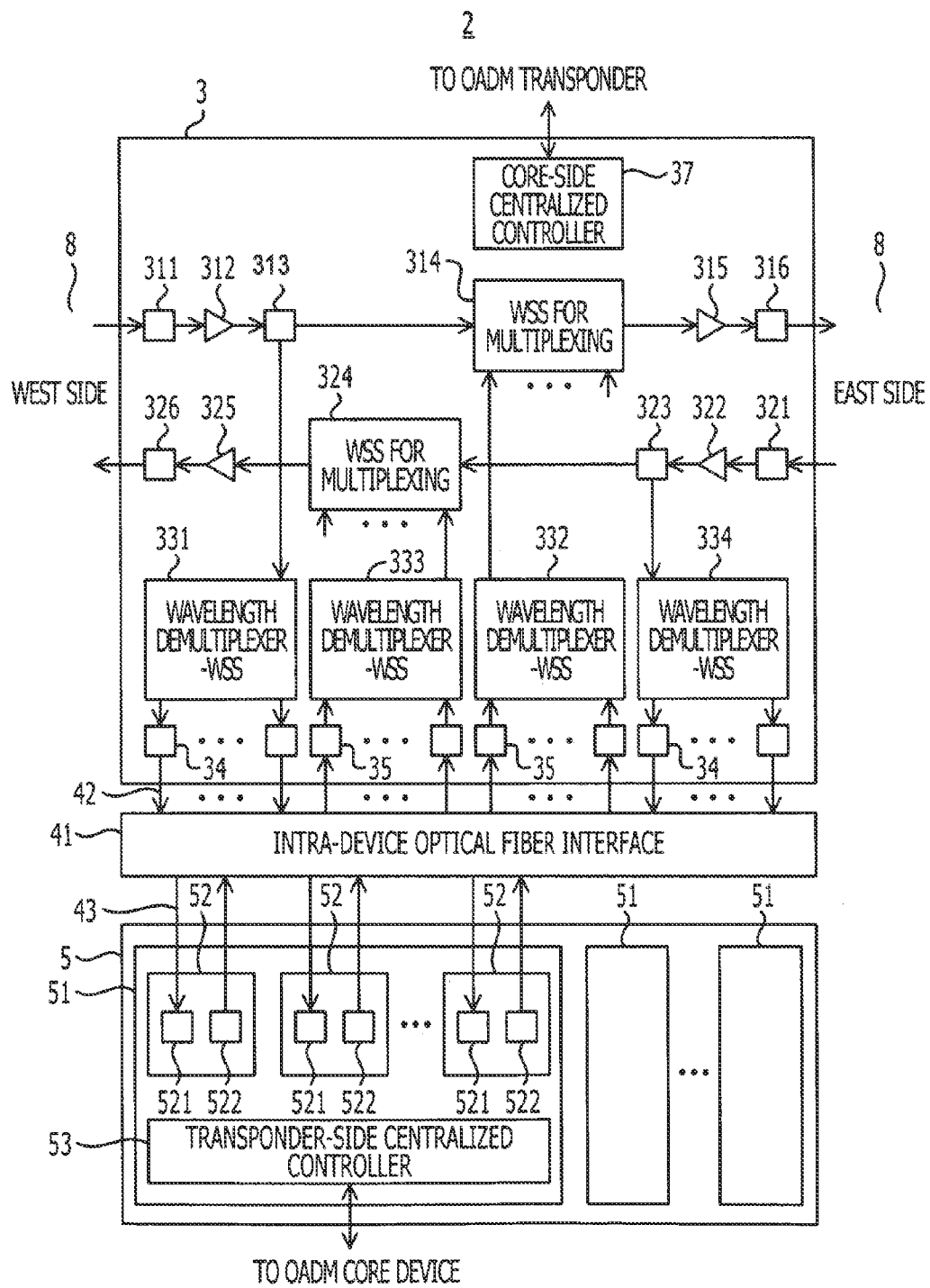
FIG. 2 is a block diagram illustrating an exemplary configuration of an OADM of the present embodiment.

As illustrated in FIG. 2, the OADM 2 includes an OADM core device 3, an intra-device optical fiber interface 41, intra-device optical fibers 42 and 43 (specifically, a core-side intra-device optical fiber 42 and a transponder-side intra-device optical fiber 43), and an OADM transponder device 5.

The OADM core device 3 adds an optical signal corresponding to a single wavelength or several wavelengths, the optical signal being transferred from the OADM transponder device 5 via the intra-device optical fiber interface 41, and the intra-device optical fibers 42 and 43, to the WDM signal group corresponding to several tens of wavelengths, the WDM signal group being transmitted via the ring network 8. In addition, the OADM core device 3 drops an optical signal corresponding to a single wavelength or several tens of wavelengths, which is transferred to the OADM transponder device 5, from the WDM signal group corresponding to several tens of wavelengths, which is transmitted via the ring network 8. Further, the OADM core device 3 transfers the dropped optical signal to the OADM transponder device 5 via the intra-device optical fiber interface 41, and the intra-device optical fibers 42 and 43.

For achieving the above-described functions, the OADM core device 3 includes a west-side optical input port 311, a west-side reception amplifier 312, a west-side photocoupler 313, an east-side wavelength selectable switch (WSS)-for-multiplexing 314, an east-side transmission amplifier 315, an east-side optical output port 316, an east-side optical input port 321, an east-side reception amplifier 322, an east-side photocoupler 323, a west-side WSS-for-multiplexing 324, a west-side transmission amplifier 325, a west-side optical output port 326, a west-side wavelength demultiplexer-WSS 331, an east-side wavelength multiplexer-WSS 332, a west-side wavelength multiplexer-WSS 333, an east-side wavelength demultiplexer-WSS 334, a plurality of core-side optical output ports 34, and a plurality of core-side optical input ports 35.

A group of WDM signals, which is input from the west-side line (west-side optical fiber) of the ring network 8 to the OADM core device 3 is input to the west-side optical input port 311 and amplified by the west-side reception amplifier 312. The amplified WDM signal group is divided by the west-side photocoupler 313, and input to the east-side WSS-for-multiplexing 314 and the west-side wavelength demultiplexer-WSS 331. In the east-side WSS-for-multiplexing 314, the optical signals corresponding to a single wavelength or several wavelengths output from the east-side wavelength multiplexer-WSS 332 are combined with the WDM signal group. The east-side wavelength multiplexer-WSS 332 multiplexes the optical signals corresponding to several wavelengths, the optical signals being transmitted from the OADM transponder device 5 to the core-side optical input port 35 via the intra-device optical fiber interface 41, and the intra-device optical fibers 42 and 43. After that, the WDM signal group is amplified by the east-side transmission amplifier 315, and output to the east-side line (east-side optical fiber) of the ring network 8 via the east-side optical output port 316. On the other hand, in the west-side wavelength demultiplexer-WSS 331, the desired optical signal corresponding to a single wavelength or several wavelengths is demultiplexed from the WDM signal group for each wavelength. The west-side wavelength demultiplexer-WSS 331 transfers the demultiplexed optical signal to the OADM transponder device 5 via the core-side optical output port 34, the intra-device optical fiber interface 41, and the intra-device optical fibers 42 and 43.

Likewise, a group of WDM signals which is input from the east-side line of the ring network 8 to the OADM core device 3 is input to the east-side optical input port 321 and amplified by the east-side reception amplifier 322. The WDM signal group amplified by the east-side reception amplifier 322 is divided by the east-side photocoupler 323, and input to the west-side WSS-for-multiplexing 324 and the east-side wavelength demultiplexer-WSS 334. In the west-side WSS-for-multiplexing 324, the optical signals corresponding to a single wavelength or several wavelengths output from the west-side wavelength multiplexer-WSS 333 are combined with the WDM signal group. The west-side wavelength multiplexer-WSS 333 multiplexes the optical signals corresponding to several wavelengths, the optical signals being transmitted from the OADM transponder device 5 to the core-side optical input port 35 via the intra-device optical fiber interface 41, and the intra-device optical fibers 42 and 43. After that, the WDM signal group is amplified by the west-side transmission amplifier 325, and output to the west-side line of the ring network 8 via the west-side optical output port 326. On the other hand, in the east-side wavelength demultiplexer-WSS 334, the desired optical signal corresponding to a single wavelength or several wavelengths is demultiplexed from the WDM signal group for each wavelength. The east-side wavelength demultiplexer-WSS 334 transfers the demultiplexed optical signal to the OADM transponder device 5 via the core-side optical output port 34, the intra-device optical fiber interface 41, and the intra-device optical fibers 42 and 43.

The OADM transponder device 5 converts the optical signal corresponding to a single wavelength or several wavelengths into a service signal, the optical signal being transferred from the OADM core device 3 via the intra-device optical fiber interface 41, and the intra-device optical fibers 42 and 43, and transfers the service signal to the client apparatus 7 or the server apparatus 6. In addition, the OADM transponder device 5 converts a service signal transmitted from the server apparatus 6 or the client apparatus 7 into an optical signal, and transfers the optical signal to the OADM core device 3 via the intra-device optical fiber interface 41.

For achieving the above-described functions, the OADM transponder device 5 includes a plurality of OADM transponder shelves 51. Each of the OADM transponder shelves 51 includes a plurality of OADM transponders 52 and a transponder-side centralized controller 53.

Each of the OADM transponders 52 includes a transponder-side optical input port 521 and a transponder-side optical output port 522. An optical signal transferred from the OADM core device 3 via the intra-device optical fiber interface 41, and the intra-device optical fibers 42 and 43 is input to the transponder-side optical input port 521. An optical signal output from the transponder-side optical output port 522 is transferred to the OADM core device 3 via the intra-device optical fiber interface 41, and the intra-device optical fibers 42 and 43. An optical signal transmitted from the transponder-side optical input port 521 to the OADM transponder 52 is converted into a service signal in the OADM transponder 52, and transferred to the client apparatus 7 or the server apparatus 6. A service signal transmitted from the server apparatus 6 or the client apparatus 7 to the OADM transponder 52 is converted into an optical signal in the OADM transponder 52, and output from the transponder-side optical output port 522.

The transponder-side centralized controller 53 controls the operations of the OADM transponders 52, and determines the erroneous connections of the intra-device optical fibers 42 and 43. More specifically, the transponder-side centralized controller 53 determines whether or not the erroneous connections of the intra-device optical fibers 42 and 43 occur. Further, the transponder-side centralized controller 53 may inform, for example, an operator of the OADM 2 of the determination result. Since the erroneous connection-determination operations will be described later in detail with reference to FIGS. 5, 6, and 7, the description thereof is omitted here.

It is preferable that optical signals that are transferred from the OADM core device 3 to the OADM transponder device 5 be individually assigned to the core-side optical output port 34, the core-side optical port and the transponder-side optical port of the intra-device optical fiber interface 41, the intra-device optical fibers 42 and 43, and the transponder-side optical input port 521 for each wavelength. That is, it is preferable that an optical signal with a single wavelength be transferred from the OADM core device 3 to the OADM transponder device 5 via a specified single core-side optical output port 34, a specified single core-side intra-device optical fiber 42, a specified single core-side optical port of the intra-device optical fiber interface 41, a specified single transponder-side optical port of the intra-device optical fiber interface 41, a specified single transponder-side intra-device optical fiber 43, and a specified single transponder-side optical input port 521. Correspondence between each wavelength of optical signals and the core-side optical output port 34, the optical input port and the optical output port of the intra-device optical fiber interface 41, the intra-device optical fibers 42 and 43, and the transponder-side optical input port 521 (namely, setting) is established by, for example, an operator of the OADM 2.

Likewise, it is preferable that optical signals that are transferred from the OADM transponder device 5 to the OADM core device 3 be individually assigned to the core-side optical input port 35, the core-side optical port and the transponder-side optical port of the intra-device optical fiber interface 41, the intra-device optical fibers 42 and 43, and the transponder-side optical input port 522 for each wavelength. That is, it is preferable that an optical signal with a single wavelength be transferred from the OADM transponder device 5 to the OADM core device 3 via a specified single transponder-side optical output port 522, a specified single transponder-side intra-device optical fiber 43, a specified single transponder-side optical port of the intra-device optical fiber interface 41, a specified single core-side optical port of the intra-device optical fiber interface 41, a specified single core-side intra-device optical fiber 42, and a specified single core-side optical input port 35. Correspondence between each wavelength of optical signals and the core-side optical input port 35, the core-side optical port and the transponder-side optical port of the intra-device optical fiber interface 41, the intra-device optical fibers 42 and 43, and the transponder-side optical output port 522 (namely, setting) is established by, for example, an operator of the OADM 2.

(1-3) Configuration of OADM Transponder

An exemplary configuration of the OADM transponder 52 will be described with reference to a block diagram of FIG. 3.

Figure 3:
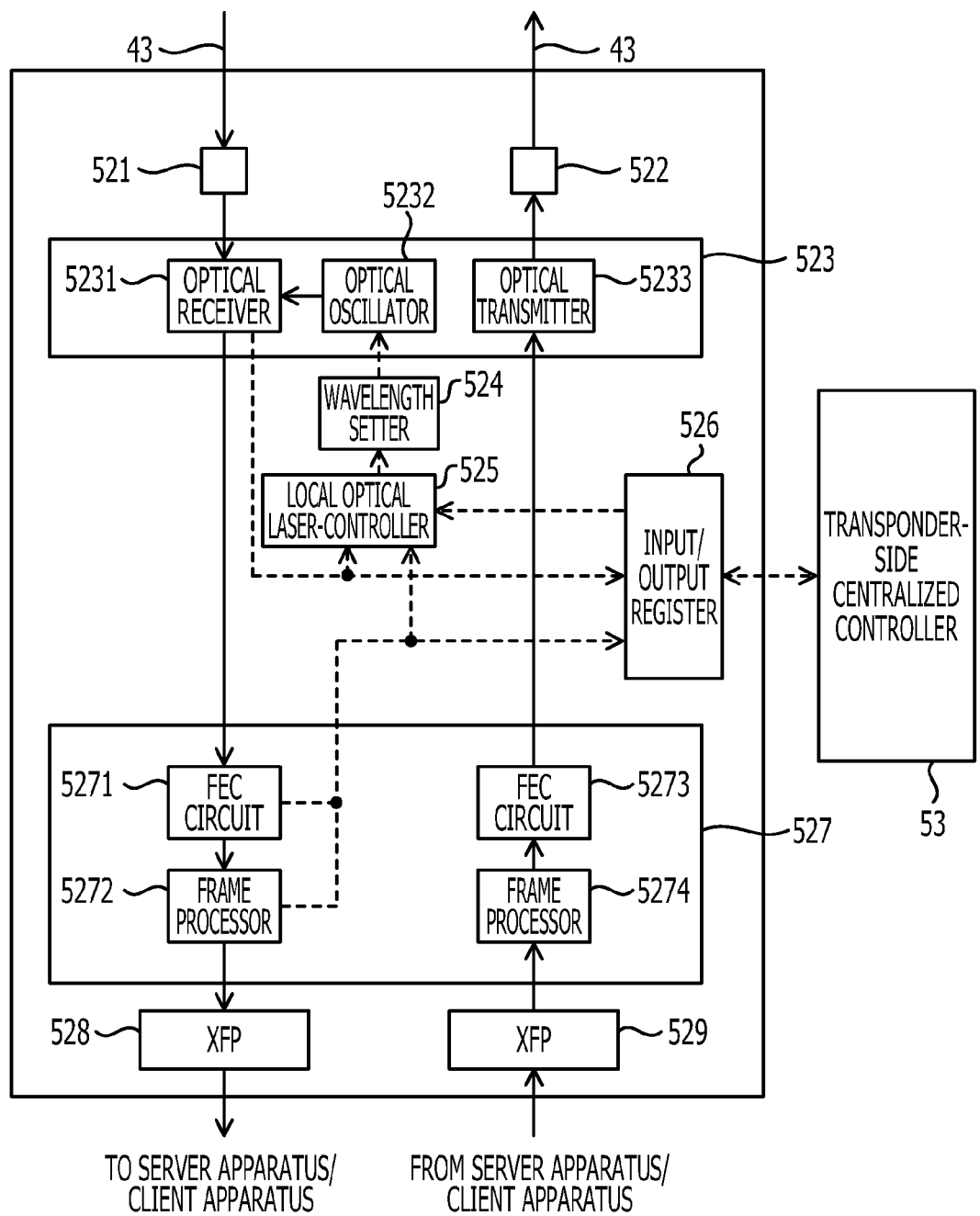
FIG. 3 is a block diagram illustrating an exemplary configuration of an OADM transponder of the present embodiment.

As illustrated in FIG. 3, the OADM transponder 52 includes the above-described transponder-side optical input port 521 and transponder-side optical output port 522, an optical transmitter/receiver 523, a wavelength setter 524, a local optical laser-controller 525, an input/output register 526, a framer LSI 527, and XFPs 528 and 529.

The optical transmitter/receiver 523 includes an optical receiver 5231, an optical oscillator 5232, and an optical transmitter 5233.

The optical receiver 5231 receives an optical signal transferred from the OADM core device 3 via the transponder-side optical input port 521 (i.e., performs photoreception). In the present embodiment, the optical receiver 5231 may preferably be an optical coherent receiver adopting an intradyne detection system. The optical receiver 5231 may adopt the intradyne detection system, or a homodyne detection system so long as a local optical laser acts with stability. Therefore, the intradyne detection system of the present embodiment includes the homodyne detection system. Therefore, it is preferable that the optical receiver 5231 include a 90°-hybrid circuit configured to generate a combined optical signal by combining an optical signal input from the transponder-side optical input port 521 and a local optical laser input from the optical oscillator 5232, a balanced receiver configured to separate the combined optical signal into a positive-phase component and a negative-phase component (or a real-part component and an imaginary-part component), and so forth. The optical receiver 5231 converts the received optical signal (that is, the positive-phase component and the negative-phase component of the combined optical signal) into a service signal, which is an electric signal. Therefore, it is preferable that the optical receiver 5231 include an optical electronic converter (O/E). The service signal through the conversion is transferred to the framer LSI 527 (more specifically, a forward error correction (FEC) circuit 5271 included in the framer LSI 527).

The optical oscillator 5232 oscillates a local optical laser as stated above. The wavelength of the local optical laser is set by the wavelength setter 524.

The optical transmitter 5233 converts the service signal transferred from the framer LSI 527 (specifically, transferred from an FEC circuit 5273 included in the framer LSI 527) into an optical signal with a wavelength compliant with the service signal. Therefore, it is preferable that the optical transmitter 5233 include a full band tunable laser (FBTL) or the like. The optical signal through the conversion is transferred to the OADM core device 3 via the transponder-side optical output port 522.

The wavelength setter 524 sets the wavelength of a local optical laser that the optical oscillator 5232 oscillates. The wavelength setter 524 sets the wavelength of a local optical laser under the control of the local optical laser-controller 525.

The local optical laser-controller 525 controls operations that are performed by the wavelength setter 524 to set the wavelength of a local optical laser. That is, the local optical laser-controller 525 controls the wavelength of a local optical laser. More specifically, the local optical laser-controller 525 controls operations of the wavelength setter 524 so that the wavelength of a local optical laser, which is set by the wavelength setter 524, becomes a desired wavelength (that is, the wavelength of a local optical laser is changed to a desired wavelength). Usually, the local optical laser-controller 525 controls operations of the wavelength setter 524 so that the wavelength of a local optical laser, which is set by the wavelength setter 524, becomes substantially equivalent to an expected wavelength (for example, with an allowable error of about ±2.5 GHz) which is the wavelength of an optical signal that is desirably received by the OADM transponder 52. When the homodyne detection system included in the intradyne detection system of the present embodiment is adopted, the local optical laser-controller 525 may control operations of the wavelength setter 524 so that the wavelength of a local optical laser, which is set by the wavelength setter 524, becomes equal to an expected wavelength which is the wavelength of an optical signal that is desirably received by the OADM transponder 52. When a loss-of-signal (LOS) signal is detected even though a local optical laser with a wavelength substantially the same as the expected wavelength is oscillated, the local optical laser-controller 525 controls operations of the wavelength setter 524 so that the wavelength of the local optical laser which is set by the wavelength setter 524 becomes different from the expected wavelength as will be described later in detail (see FIGS. 7 to 9).

Figure 4:
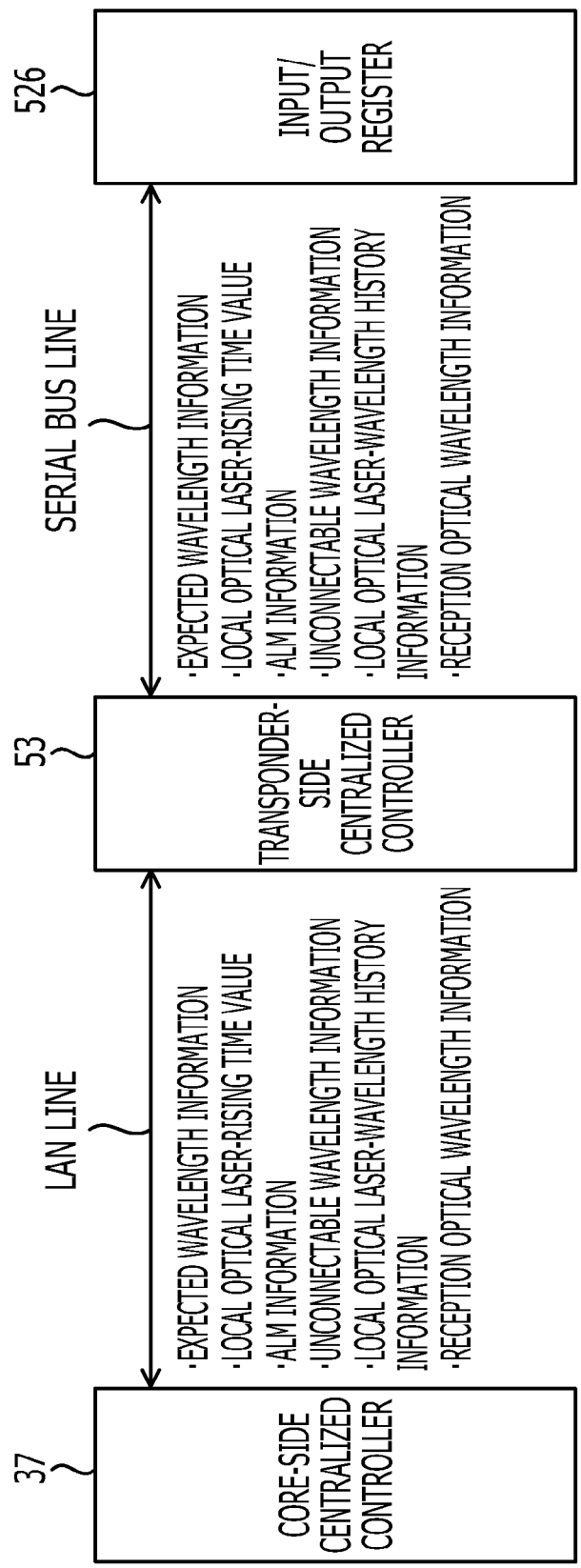
FIG. 4 is a schematic diagram illustrating various parameters in association with processors referring thereto, where data of the various parameters is stored in an input/output register.

The input/output register 526 is a register storing various parameters that are used in the OADM 2. The various parameters that are stored in the input/output register 526 will be described with reference to FIG. 4. FIG. 4 is a schematic diagram illustrating the various parameters in association with processors referring thereto.

As illustrated in FIG. 4, the input/output register 526 stores expected-wavelength information, local optical laser-rising time-value information, alarm (ALM) information, unconnectable wavelength information, local optical laser-wavelength history information, and reception optical wavelength information. The transponder-side centralized controller 53 may acquire the above-described information and store the information in the input/output register 526 via a serial bus line provided in the OADM transponder device 5. Further, the core-side centralized controller 37 may acquire the above-described information and store the information in the input/output register 526 via the transponder-side centralized controller 53 and a LAN line provided in the OADM 2. That is, it is preferable that the above-described information be sequentially updated by the OADM transponder 52, the transponder-side centralized controller 53, and the core-side centralized controller 37. Further, it is preferable that latest information sequentially updated be stored in the input/output register 526.

The expected wavelength information includes information indicating an expected wavelength which is the wavelength of an optical signal that is desirably received by the OADM transponder 52. That is, the expected wavelength information includes information indicating the wavelength (expected wavelength) of an optical signal that is desirably transmitted from the OADM core device 3 to the OADM transponder 52 via the intra-device optical fiber interface 41, and the intra-device optical fibers 42 and 43.

The local optical laser-rising time-value information includes information indicating the time required from when the optical oscillator 5232 starts oscillating a local optical laser to when the oscillation is stabilized. In other words, the local optical laser-rising time-value information includes information indicating the time required from when the optical oscillator 5232 starts oscillating the local optical laser and the optical receiver 5231 starts receiving an optical signal and a local optical laser to when the intradyne detection is successfully performed by the optical receiver 5231.

The ALM information includes information indicating whether or not an alarm signal including a loss-of-light (LOL) signal or a LOS signal is detected. The LOL signal is an alarm signal detected when the optical receiver 5231 has difficulty in receiving an optical signal (namely, difficulty in receiving light) or when the reception level of an optical signal (light reception level) is deteriorated. Accordingly, the LOL signal is received from the optical receiver 5231 and stored in the input/output register 526 as indicated by a dotted line in FIG. 3. The LOL signal may also be input to the local optical laser-controller 525. In that case, the LOL signal may be stored in the input/output register 526 by an operation performed by the local optical laser-controller 525. The LOS signal is detected when the framer LSI 527 has difficulty in processing a service signal converted from an optical signal, for example. More specifically, the LOS signal is detected when it is difficult for the FEC circuit 5271 to correct an error in a service signal, or when it is difficult for a frame processor 5272 to perform framing processing on a service signal. Therefore, the LOS signal is received from the framer LSI 527 (for example, the FEC circuit 5271 or the frame processor 5272) and stored in the input/output register 526 as indicated by a dotted line in FIG. 3. The LOS signal may also be input to the local optical laser-controller 525. In that case, the LOS signal may be stored in the input/output register 526 by an operation performed by the local optical laser-controller 525.

The unconnectable wavelength information includes information indicating the wavelength of an optical signal which is not received (has not been received) by any of the OADM transponders 52 included in the OADM transponder device 5. Accordingly, when any one of the OADM transponders 52 receives an optical signal with a specified wavelength, information indicating the specified wavelength is not included in (or removed from (as the case may be)) the unconnectable wavelength information.

The local optical laser-wavelength history information includes information indicating the history of wavelengths of local optical lasers that are oscillated from the optical oscillator 5232.

The reception optical wavelength information includes information indicating the wavelength of an optical signal received by the OADM transponder 52. Therefore, when an optical signal is not yet received by the OADM transponder 52, the reception optical wavelength information may not necessarily include the information indicating the wavelength of the optical signal, and may include dummy information or NULL information.

As illustrated in FIG. 3, the framer LSI 527 includes the FEC circuit 5271, the frame processor 5272, the FEC circuit 5273, and a frame processor 5274.

The FEC circuit 5271 performs processing to correct an error in a service signal transferred from the optical receiver 5231 (e.g. error correction code-addition processing, correction processing using an error correction code, and so forth).

The FEC circuit 5271 transfers the service signal subjected to the error correction processing to the frame processor 5272.

The frame processor 5272 performs framing processing on a service signal transferred from the FEC circuit 5271. When the OADM 2 conforms to Optical Transport Network (OTN), for example, the frame processor 5272 converts the service signal into a service signal conforming to a frame of an optical-channel-payload-unit (OPU), an optical-channel-data-unit (ODU), an optical-channel-transport-unit (OTU), or the like. The frame processor 5272 transfers the service signal subjected to the framing processing to the XFP 528.

The FEC circuit 5273 performs the error correction processing on a service signal transferred from the frame processor 5274. The FEC circuit 5273 transfers the service signal subjected to the error correction processing to the optical transmitter 5233.

The frame processor 5274 performs deframing processing on a service signal transferred from the XFP 529. When the OADM 2 conforms to OTN, for example, the frame processor 5274 performs deframing processing on a service signal conforming to a frame of OPU, ODU, OTU, or the like. The frame processor 5274 transfers the service signal subjected to the deframing processing to the FEC circuit 5273.

The XFP 528 transfers the service signal transferred from the frame processor 5272 to the client apparatus 7 or the server apparatus 6 as an optical signal.

The XFP 529 receives the service signal transferred from the server apparatus 6 or the client apparatus 7 as an optical signal, and transfers the received service signal to the frame processor 5274.

(2) Operations of OADM

The operations of the OADM 2 will be described with reference to FIGS. 5 to 9.

(2-1) Initial Setting Operations

Initial setting operations of the OADM 2 will be described with reference to FIG. 5 which is a flowchart illustrating the flow of the initial setting operations.

Figure 5:
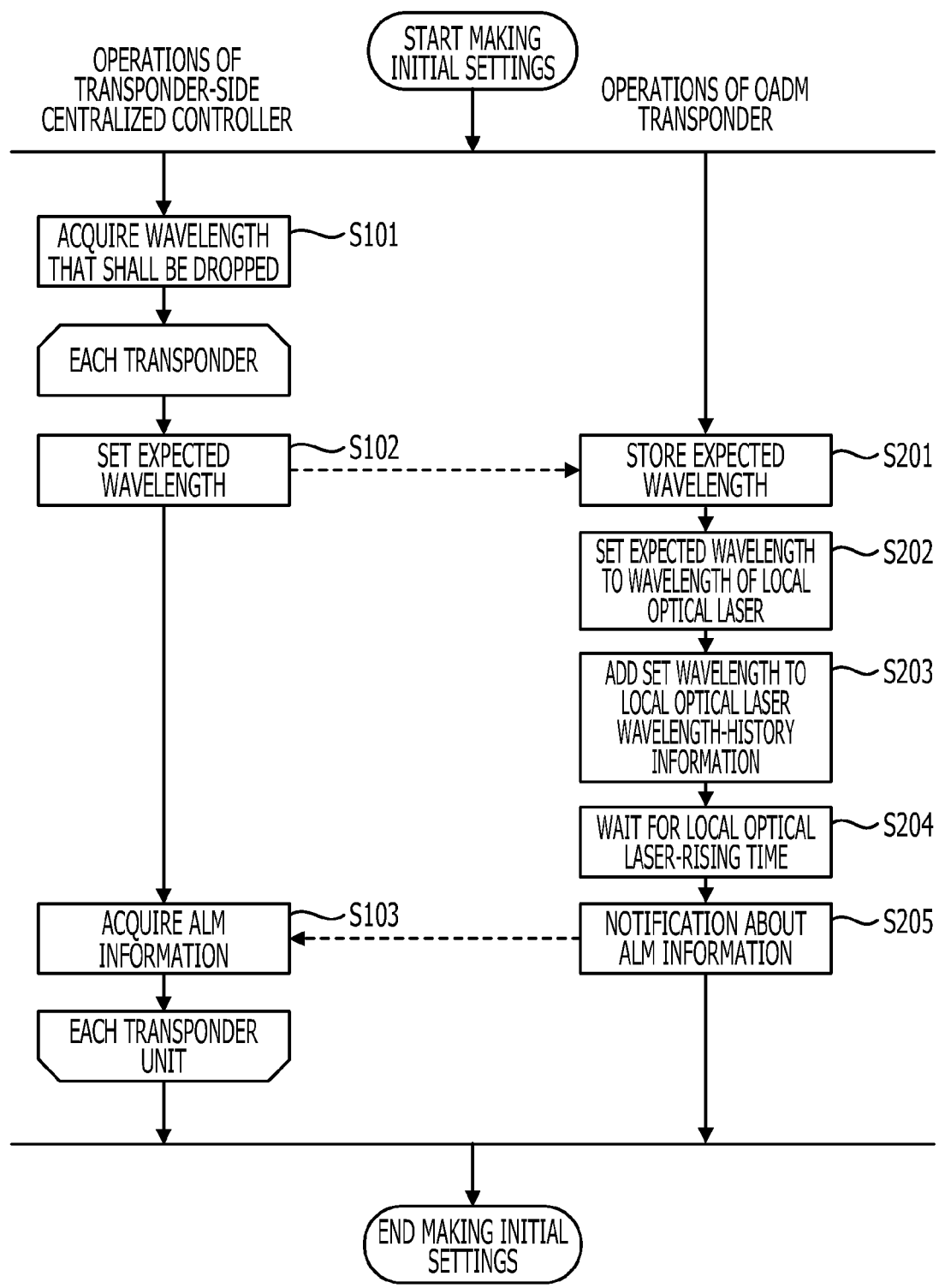
FIG. 5 is a flowchart illustrating the flow of initial setting operations of the OADM.

As illustrated in FIG. 5, the transponder-side centralized controller 53 acquires information relating to the wavelengths of optical signals that are dropped to the OADM transponders 52 that are controlled by the transponder-side centralized controller 53 (operation S101). It is preferable that the core-side centralized controller 37 collectively manage information indicating which optical signal is dropped to which OADM transponder 52 via which port, regarding optical signals corresponding to several tens of wavelengths included in the WDM signal group. Therefore, it is preferable that the transponder-side centralized controller 53 acquire, from the core-side centralized controller 37, information about the wavelength of an optical signal to be dropped.

Subsequently, for each of the OADM transponders 52, the transponder-side centralized controller 53 determines based on the information acquired through operation S101 an expected wavelength which is the wavelength of an optical signal that is desirably received by the corresponding OADM transponder 52 (operation S102). The transponder-side centralized controller 53 transfers the determined expected wavelength to the input/output register 526 of the corresponding OADM transponder 52 via serial bus lines.

Each of the OADM transponders 52 stores the expected wavelength set by the transponder-side centralized controller 53 in the input/output register 526 as the expected wavelength information (operation S201). Subsequently, the local optical laser-controller 525 controls operations of the wavelength setter 524 so that the wavelength of a local optical laser, which is set by the wavelength setter 524, becomes substantially equivalent to the expected wavelength stored in the input/ output register 526 (for example, with an allowable error of about ±2.5 GHz) (operation S202). As a result, the optical oscillator 5232 oscillates a local optical laser with a wavelength substantially equivalent to the expected wavelength. In addition, the local optical laser-controller 525 adds information about the wavelength of the local optical laser oscillated from the optical oscillator 5232 to the local optical laser-wavelength history information stored in the input/output register 526 (operation S203).

After that, the local optical laser-controller 525 waits for a period of time indicated by the local optical laser-rising time-value information stored in the input/output register 526 (operation S204). After having waited, the local optical laser-controller 525 determines whether or not the ALM information is present. That is, the local optical laser-controller 525 determines whether or not the LOL signal or the LOS signal is detected. Additionally, the local optical laser-controller 525 notifies the transponder-side centralized controller 53 of the ALM information indicating the determination result via the input/output register 526 (operation S205).

As a result, the transponder-side centralized controller 53 acquires the ALM information for each OADM transponder 52 (operation S103). Therefore, the transponder-side centralized controller 53 can determine whether or not the LOL signal is detected and whether or not the LOS signal is detected.

Part or all of the operations of the transponder-side centralized controller 53 may be performed by the core-side centralized controller 37 likewise the following operations that will be described with reference to FIGS. 6 and 7 (operations to detect erroneous connection of the intra-device optical fibers 42 and 43).

(2-2) Operations to Detect Erroneous Connection of Intra-device Optical Fiber

Operations to detect erroneous connection of the intra-device optical fibers 42 and 43 of the OADM 2 (that is, operations performed to determine whether or not the erroneous connections occur in the intra-device optical fibers 42 and 43) will be described with reference to FIGS. 6 and 7. FIG. 6 is a flowchart illustrating the flow of part of the operations to detect erroneous connection of the intra-device optical fibers 42 and 43 of the OADM 2. FIG. 7 is a flowchart illustrating other part of the above-described erroneous connection-detection operations. It is preferable that the erroneous connection-detection operations illustrated in FIGS. 6 and 7 be performed on each OADM transponder 52.

Figure 6:
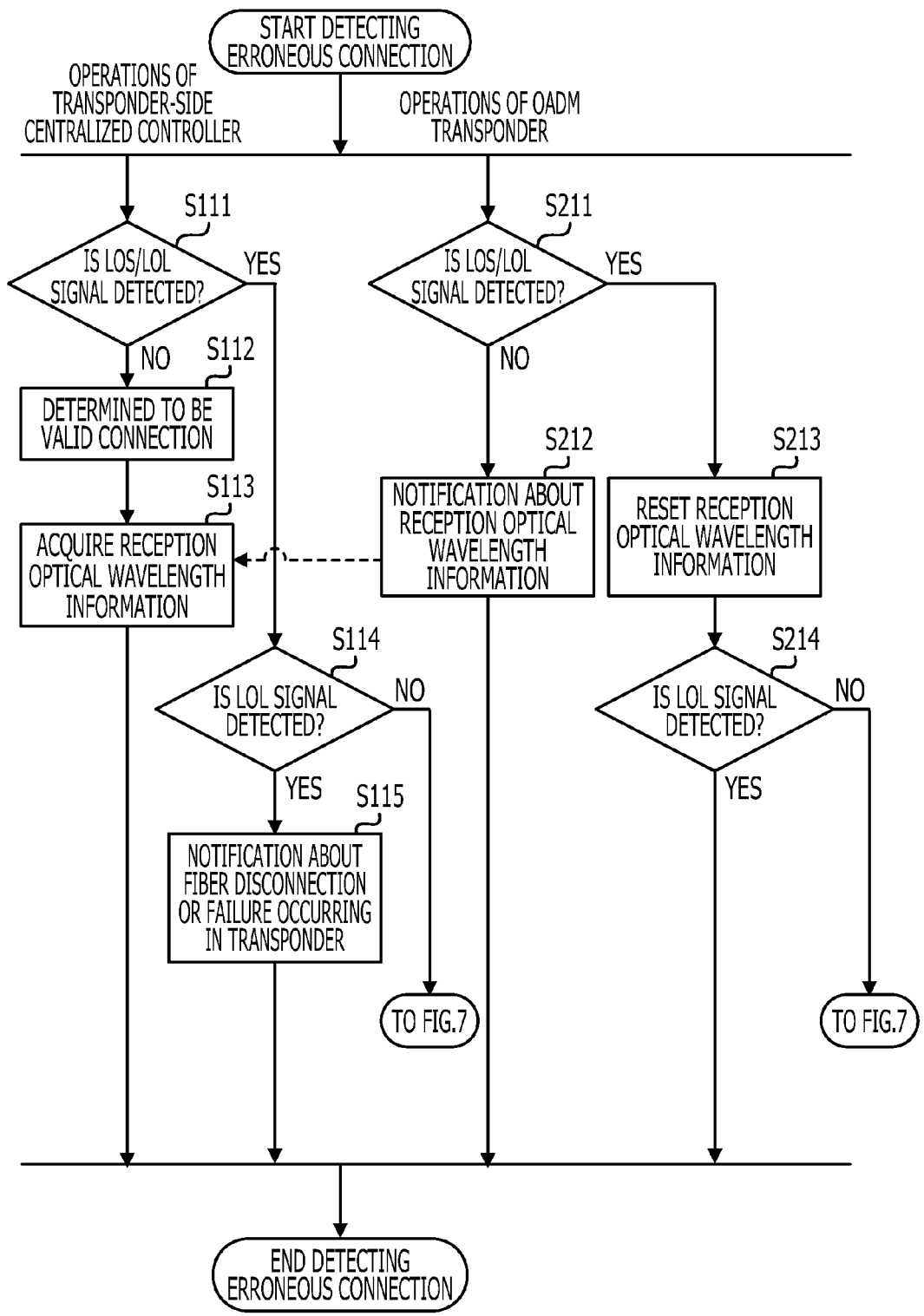
FIG. 6 is a flowchart illustrating the flow of part of erroneous connection-detection operations of intra-device optical fibers of the OADM.

As illustrated in FIG. 6, the transponder-side centralized controller 53 determines whether or not one or more of the LOL signal and the LOS signal is detected based on the ALM information acquired at operation S103 illustrated in FIG. 5 (operation S111). Likewise, the local optical laser-controller 525 determines whether or not one or more of the LOL signal and the LOS signal is detected based on the ALM information provided at operation S205 illustrated in FIG. 5 (operation S211).

When it is determined based on the determination results at operations S111 and S211 that neither the LOL signal nor the LOS signal is detected (operation S111: No and operation S211: No), the transponder-side centralized controller 53 determines that the intra-device optical fibers 42 and 43 are not erroneously coupled to the OADM transponder 52 (operation S112). That is, the transponder-side centralized controller 53 determines that the OADM transponder 52 successfully receives an optical signal having the expected wavelength (operation S112). In that case, therefore, the local optical laser-controller 525 registers the expected wavelength into the input/output register 526 as the reception optical wavelength information, and notifies the transponder-side centralized controller 53 of the reception optical wavelength information (operation S212). The transponder-side centralized controller 53 acquires the reception optical wavelength information (operation S113). After that, ordinary operations are performed. The optical oscillator 5232 may inform the transponder-side centralized controller 53 of the reception optical wavelength information.

On the other hand, when it is determined based on the determination results at operations S111 and S211 that one or more of the LOL signal and the LOS signal is detected (operation S111: Yes and operation S211: Yes), the local optical laser-controller 525 resets the details of the reception optical wavelength information (operation S213). Subsequently, the transponder-side centralized controller 53 determines whether or not the LOL signal is detected (operation S114). Likewise, the local optical laser-controller 525 determines whether or not the LOL signal is detected (operation S214).

When it is determined based on the determination results at operations S114 and S214 that the LOL signal is detected (operation S114: Yes and operation S214: Yes), the transponder-side centralized controller 53 estimates that the LOL signal is detected due to the disconnections of the intra-device optical fibers 42 and 43, or a failure occurring in the OADM transponder 52. Therefore, the transponder-side centralized controller 53 notifies, for example, an operator of the OADM 2 of the disconnections and the failure occurrence (operation S115). Alternatively, the transponder-side centralized controller 53 may analyze the cause of the LOL signal detection further in detail and notify the operator of the analysis result.

On the other hand, when it is determined based on the determination results at operations S114 and S214 that the LOL signal is not detected (operation S114: No and operation S214: No), it is estimated that incompatible or improper or erroneous intra-device optical fibers 42 and 43 or the network may be causing the LOS signal detection. Therefore, the transponder-side centralized controller 53 and the OADM transponder 52 perform the operations illustrated in FIG. 7.

Figure 7:
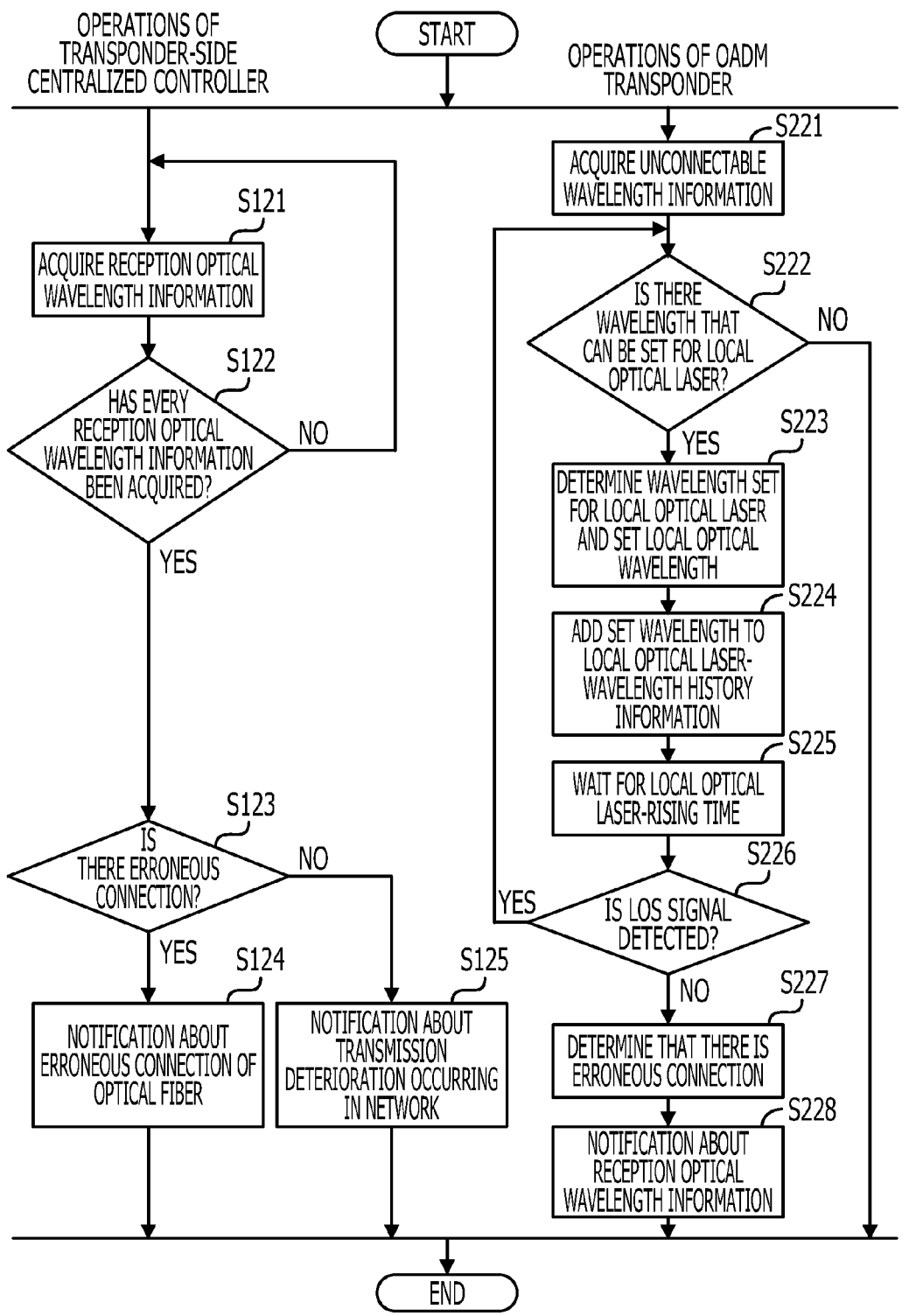
FIG. 7 is a flowchart illustrating the flow of other part of the erroneous connection-detection operations.

As illustrated in FIG. 7, the local optical laser-controller 525 acquires the unconnectable wavelength information stored in the input/output register 526 (operation S221). Additionally, the local optical laser-controller 525 may acquire the expected wavelength information and the local optical laser-wavelength history information that are stored in the input/output register 526. After that, the local optical laser-controller 525 determines whether or not a wavelength that can be set as the wavelength of a local optical laser is present based on the unconnectable wavelength information, the expected wavelength information, and the local optical laser-wavelength history information that are acquired at operation S221 (operation S222). More specifically, the local optical laser-controller 525 determines whether or not the unconnectable wavelength information includes information about a wavelength different from an expected wavelength indicated by the expected wavelength information and a wavelength indicated by the local optical laser-wavelength history information. When the unconnectable wavelength information includes the information about the different wavelength, it is determined that the wavelength that can be set as the wavelength of a local optical laser is present. When the unconnectable wavelength information does not include the information about the different wavelength, it is determined that the wavelength that can be set as the wavelength of a local optical laser is not present.

When the determination result at operation S222 indicates that the wavelength that can be set as the wavelength of a local optical laser is not present (operation S222: No), the OADM transponder 52 terminates the operations to detect the erroneous connections of the intra-device optical fibers 42 and 43.

On the other hand, when the determination result at operation S222 indicates that the wavelength that can be set as the wavelength of a local optical laser is present (operation S222: Yes), the local optical laser-controller 525 controls operations of the wavelength setter 524 so that the wavelength of a local optical laser, which is set by the wavelength setter, becomes substantially equivalent to the wavelength that is indicated by the unconnectable wavelength information and which is different from the expected wavelength indicated by the expected wavelength information and the wavelength indicated by the local optical laser-wavelength history information (operation S223). As a result, the optical oscillator 5232 oscillates a local optical laser having a wavelength which is substantially equivalent to the above-described different wavelength. In addition, the local optical laser-controller 525 adds information about the wavelength of the local optical laser oscillated from the optical oscillator 5232 to the local optical laser-wavelength history information stored in the input/output register 526 (operation S224). According to an aspect of an embodiment, the different wavelength from the expected wavelength is a wavelength substantially equal to that of an actually received optical signal.

Subsequently, the local optical laser-controller 525 waits for a period of time indicated by the local optical laser-rising time-value information stored in the input/output register 526 (operation S225). After having waited, the local optical laser-controller 525 determines whether or not the LOS signal is detected (operation S226).

When the determination result at operation S226 indicates that the LOS signal is detected (operation S226: Yes), the local optical laser-controller 525 repeats the operations of operation S222 and subsequent operations.

On the other hand, when the determination result at operation S226 indicates that the LOS signal is not detected (operation S226: No), it is determined that the OADM transponder 52 receives an optical signal having a wavelength different from the expected wavelength indicated by the expected wavelength information. That is, it is determined that an intra-device optical fiber 42 or 43 different from the intra-device optical fiber 42 or 43 transferring an optical signal with the expected wavelength is coupled to the OADM transponder 52. In other words, a different intra-device optical fiber 42 or 43 transferring an optical signal with a wavelength different from the expected wavelength is coupled to the OADM transponder 52. Therefore, the local optical laser-controller 525 determines that the erroneous connections of the intra-device optical fibers 42 and 43 occur, and notifies the transponder-side centralized controller 53 of the erroneous connections (operation S227). As a result, the transponder-side centralized controller 53 can determine that the erroneous connections of the intra-device optical fibers 42 and 43 has occurred. In addition, the local optical laser-controller 525 registers information about the wavelength of the received optical signal (or the wavelength of a local optical laser which is set immediately before the termination of LOS signal detection) into the input/output register 526 as the reception optical wavelength information, and notifies the transponder-side centralized controller 53 of the reception optical wavelength information (operation S228).

The transponder-side centralized controller 53 acquires the reception optical wavelength information for each notification from the local optical laser-controller 525 of the reception optical wavelength information (operation S121). After that, the transponder-side centralized controller 53 determines whether or not information about the wavelength of each of optical signals that are desirably received by all the OADM transponders 52 that are controlled by the transponder-side centralized controller 53 is acquired as the reception optical wavelength information (operation S122). That is, the transponder-side centralized controller 53 determines whether or not the information about the wavelength of each of optical signals that is to be dropped to the OADM transponders 52 that are controlled by the transponder-side centralized controller 53 is acquired as the reception optical wavelength information (operation S122).

When the determination result at operation S122 indicates that the information about the wavelength of each of the optical signals is not completely acquired as the reception optical wavelength information (operation S122: No), the transponder-side centralized controller 53 repeats the operation of operation S121 and subsequent operations.

On the other hand, when the determination result at operation S122 indicates that the information about the wavelength of each of the optical signals is completely acquired as the reception optical wavelength information (operation S122: Yes), the transponder-side centralized controller 53 determines whether or not notification from the OADM transponder 52 of the erroneous connections of the intra-device optical fibers 42 and 43 is present (operation S123).

The determination result at operation S123 indicates the presence of the notification about the erroneous connections of the intra-device optical fibers 42 and 43 (operation S123: Yes), the transponder-side centralized controller 53 determines that the LOS signal is detected at operations S111 and S114 due to the erroneous connections of the intra-device optical fibers 42 and 43. Therefore, the transponder-side centralized controller 53 notifies, for example, the operator of the OADM 2 of occurrence of the erroneous connections of the intra-device optical fibers 42 and 43 (operation S124). For example, the transponder-side centralized controller 53 may notify, for example, the operator of the OADM 2 of identification numbers or the like of the intra-device optical fibers 42 and 43 where the erroneous connections have occurred. Alternatively, the transponder-side centralized controller 53 may specify, for example, the OADM transponder shelves 51 coupled to the intra-device optical fiber 43 where the erroneous connection occurs, a port coupled to the intra-device optical fiber 42 where the erroneous connection occurs, and so forth, and may notify the operator of the specified OADM transponder shelf 51, the specified port, and so forth in combination. For example, the transponder-side centralized controller 53 may determine one or more of the identification numbers of: the OADM transponder shelf 51, the core-side optical output port 34, the core-side optical input port 35, the core-side optical port of the intra-device optical fiber interface 41, the transponder-side optical port of the intra-device optical fiber interface 41, the transponder-side optical input port 521, and the transponder-side optical output port 522 to be an object where the erroneous connection occurs.

On the other hand, when the determination result at operation S123 indicates the absence of the notification about the erroneous connections of the intra-device optical fibers 42 and 43 (operation S123: No), the transponder-side centralized controller 53 determines that the LOS signal detected at operations S111 and S114 illustrated in FIG. 6 is due to the transmission deterioration occurring in the ring network 8. Therefore, the transponder-side centralized controller 53 notifies, for example, the operator of the OADM 2 that the transmission deterioration occurs in the ring network 8 (operation S125).

With reference to FIGS. 8A to 8D, the technical significance of operations of the OADM transponder 52 illustrated in FIG. 7 (that is, the reception operations continuously performed while changing the wavelength of a local optical laser) will be described in association with the characteristics of the optical receiver 5231. FIGS. 8A to 8D are graphs each illustrating the expected wavelength, the wavelength of a local optical laser, and the wavelength of an actually received optical signal in association with the characteristics of the optical receiver 5231.

Figure 8A:
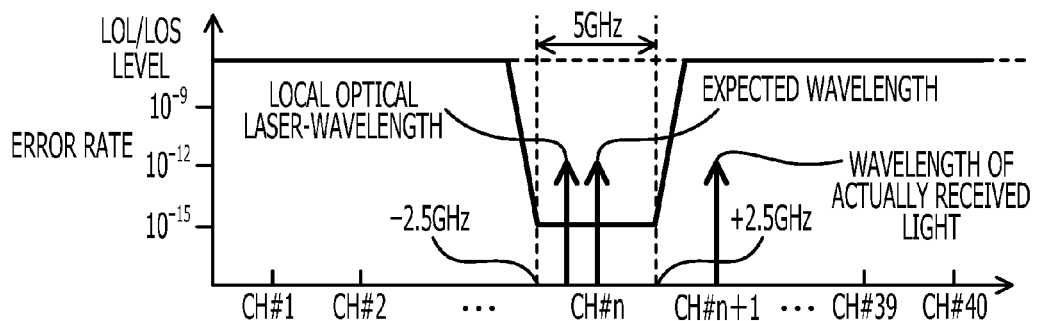
FIGS. 8A to 8D are graphs illustrating an expected wavelength, the wavelength of a local optical laser, and the wavelength of an actually received optical signal in association with the characteristic of an optical receiver.
Figure 8B:
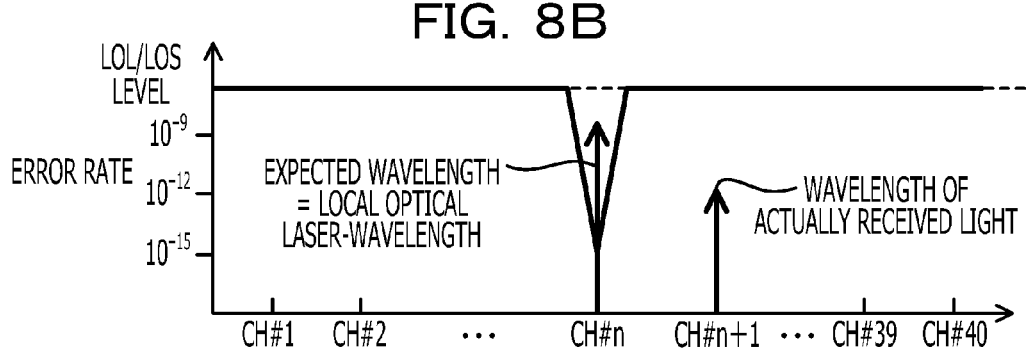

Originally, the wavelength of a local optical laser is set to be substantially equal to the expected wavelength as illustrated in FIG. 8A. That is, the wavelength of a local optical laser is set so that the error between the wavelength of a local optical laser and the expected wavelength becomes ±2.5 GHz or less. In the case where the homodyne detection system included in the intradyne detection system of the present embodiment is adopted, the wavelength of a local optical laser is set to be substantially equal to the expected wavelength as illustrated in FIG. 8B. In that case, the intradyne detection is appropriately performed when the optical receiver 5231 receives an optical signal having the expected wavelength. Therefore, the error rate of the received optical signal does not exceed the LOS level. Consequently, the LOS signal is not detected.

On the one hand, as illustrated in FIG. 8A, given that the wavelength of an optical signal which is actually received by the optical receiver 5231 (e.g., the wavelength #n+1 corresponding to a channel CH#n+1) is different from the expected wavelength (the wavelength #n corresponding to the channel CH#n), the wavelength of a local optical laser does not become substantially equal to that of the actually received optical signal. That is, the error between the wavelength of a local optical laser and that of the actually received optical signal becomes more than ±2.5 GHz. Therefore, the intradyne detection is not appropriately performed even though the optical receiver 5231 receives an optical signal, so that the error rate of the received optical signal may exceed the LOS level. Consequently, the LOS signal may be detected. Likewise, even though the homodyne detection system included in the intradyne detection system of the present embodiment is adopted, the wavelength of a local optical laser does not become equal to that of the actually received optical signal as illustrated in FIG. 8B. Therefore, the homodyne detection is not appropriately performed even though the optical receiver 5231 receives an optical signal, which may cause the error rate of the received optical signal to exceed the LOS level. Consequently, the LOS signal may be detected.

Figure 8C:
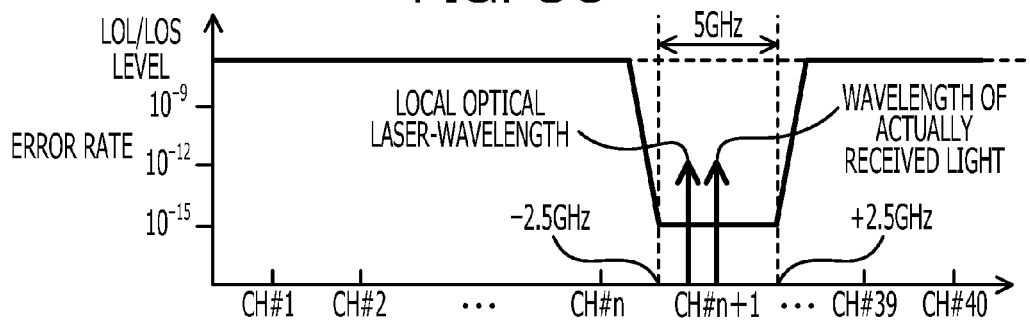
Figure 8D:
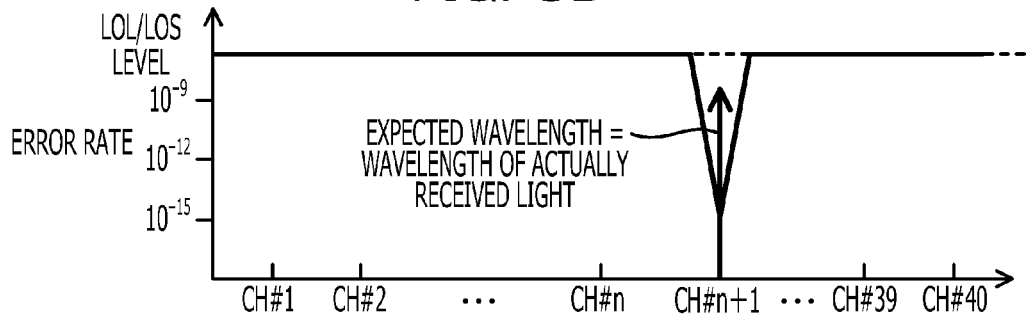

On the other hand, as illustrated in FIG. 8C, given that the wavelength of a local optical laser is changed to a wavelength (e.g., the wavelength #n+1 corresponding to a channel CH#n+1) which is different from the expected wavelength (e.g., the wavelength #n corresponding to the channel CH#n), the wavelength of a local optical laser becomes substantially equal to that of the actually received optical signal. That is, the error between the wavelength of a local optical laser and the actually received wavelength becomes ±2.5 GHz or less. Therefore, the intradyne detection is appropriately performed when the optical receiver 5231 receives an optical signal, so that the error rate of the received optical signal does not exceed the LOS level. Consequently, the LOS signal is not detected. Likewise, even though the homodyne detection system included in the intradyne detection system of the present embodiment is adopted, the wavelength of a local optical laser is changed to be the same wavelength as that of the actually received optical signal as illustrated in FIG. 8D. Therefore, the homodyne detection is appropriately performed when the optical receiver 5231 receives an optical signal, so that the error rate of the received optical signal does not exceed the LOS level. Consequently, the LOS signal is not detected.

The above-described case may occur when the intra-device optical fibers 42 and 43 where optical signals with the expected wavelengths are transmitted and the intra-device optical fibers 42 and 43 where optical signals that are actually received by the optical receiver 5231 are transmitted are erroneously coupled. That is, since the intra-device optical fibers 42 and 43 where optical signals with the expected wavelengths are transmitted are erroneously coupled, the LOS signal may be detected even though the wavelength of a local optical laser is set to a value which is substantially equal to that of the expected wavelength. Likewise, since the intra-device optical fibers 42 and 43 where the optical signals that are actually received by the optical receiver 5231 are transmitted are erroneously coupled, no more LOS signal may be detected when the wavelength of a local optical laser is set to a value which is substantially equal to that of a wavelength different from the expected wavelength. Consequently, with the operations that are illustrated in FIGS. 6 and 7, the erroneous connections of the intra-device optical fibers 42 and 43 are appropriately detected, and the erroneously coupled intra-device optical fibers 42 and 43 are appropriately specified.

According to the transmission system 1 of the present embodiment, the OADM 2 (or the OADM transponder 5 or the OADM transponder 52) using an optical coherent receiver adopting the intradyne detection system as the optical receiver 5231 can appropriately detect the erroneous connections of the intra-device optical fiber 42 or 43 (that is, whether or not the erroneous connection occurs can appropriately be determined) as described above. Accordingly, it becomes possible to eliminate undesired effects relatively quickly, the undesired effects being caused by erroneous connections that may occur when a wavelength or line is added, for example. In addition, the maintenance of the transmission system 1 can be performed with reduced cost.

Further, the transmission system 1 of the present embodiment uses the unconnectable wavelength information, the expected wavelength information, the local optical laser-wavelength history information, etc., thereby appropriately detecting the erroneous connection of the intra-device optical fiber 42 or 43.

The erroneous connection of a different optical fiber provided in the OADM 2 and used to transmit an optical signal can also be detected in the above-described manner in addition to or in place of the erroneous connections of the intra-device optical fibers 42 and 43 mutually connecting the OADM core device 3, the intra-device optical fiber interface 41, and the OADM transponder device 5.

(3) Modifications

Modifications of the OADM 2 of the present embodiment will be described with reference to FIGS. 9 to 13.

(3-1) First Modification

A first modification will be described with reference to FIG. 9. As compared to the above-described transmission system 1 of the present embodiment, an optical interface of the first modification, which is provided between the OADM core device 3 and the OADM transponder device 5, is differently configured. Hereinafter, therefore, the first modification will be described regarding the configuration different from that of the above-described transmission system 1 of the present embodiment, and the same configurations as those of the above-described transmission system 1 of the present embodiment are designated by the same reference numerals and the detailed descriptions thereof are omitted.

Figure 9:
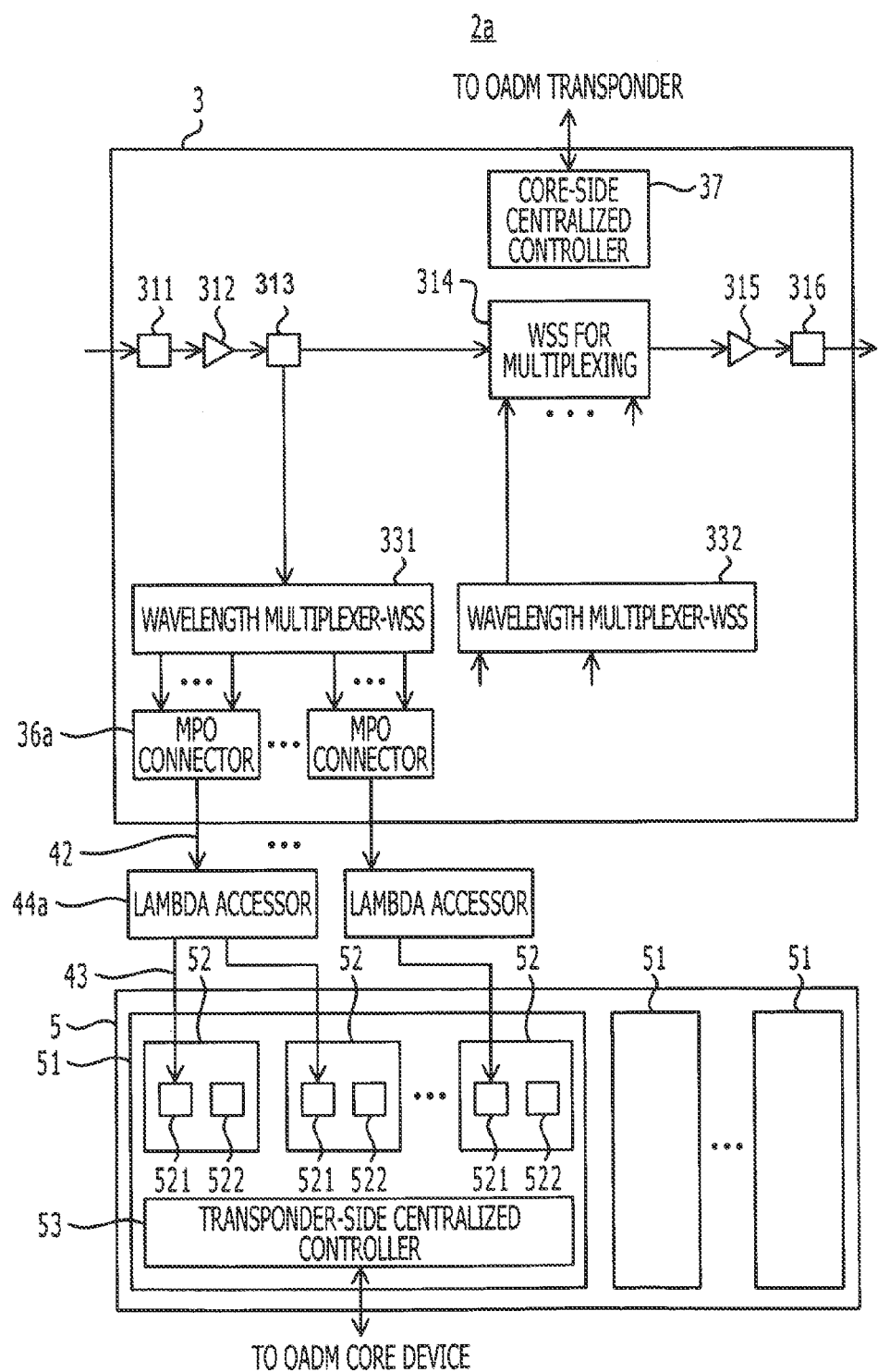
FIG. 9 is a block diagram illustrating an exemplary configuration of an OADM of a first modification.

As illustrated in FIG. 9, an OADM 2a of the first modification includes multi port optical cable (MPO) connectors 36a that collectively transmit the outputs of a west-side wavelength multiplexer-WSS 331 through a ribbon fiber-type core-side intra-device optical fiber 42 and lambda accessors 44a that convert a ribbon fiber-type core-side intra-device optical fiber 42 into each transponder-side intra-device optical fiber 43. The MPO connectors 36a and lambda accessors 44a are provided as an optical interface between the OADM core device 3 and the OADM transponder device 5 in place of the above-described core-side optical output port 34, core-side optical input port 35, and intra-device optical fiber interface 41. In addition to or in place of the outputs of the west-side wavelength multiplexer RSS 331, inputs to an east-side wavelength multiplexer-RS 332, inputs to the west-side wavelength multiplexer-WSS 333, and the outputs of an east-side wavelength demultiplexer-WSS may be collectively transmitted through the ribbon fiber-type core-side intra-device optical fibers 42. That is, in the OADM 2a of the first modification, the inputs to and outputs from the OADM core device 3 are collectively transmitted through the ribbon fiber-type core-side intra-device optical fibers 42. Accordingly, the core-side intra-device optical fibers 42 can be handled (routed) with relative ease.

According to the first modification, one or more of the identification numbers of: the OADM transponder shelves 51, the intra-device optical fibers 42 and 43, the optical output ports of the MPO connectors 36a, the lambda accessors 44a, the transponder-side optical ports of the lambda accessors 44a, the transponder-side optical input ports 521, and the transponder-side optical output ports 522 may be determined to be an object where the erroneous connection occurs.

(3-2) Second Modification

A second modification will be described with reference to FIG. 10. As compared to the above-described transmission system 1 of the present embodiment, the OADM transponder 52 of the second modification is differently configured. Hereinafter, therefore, the second modification will be described regarding the configuration different from that of the above-described transmission system 1 of the present embodiment, and the same configurations as those of the transmission system 1 are designated by the same reference numerals and the detailed descriptions thereof are omitted.

Figure 10:
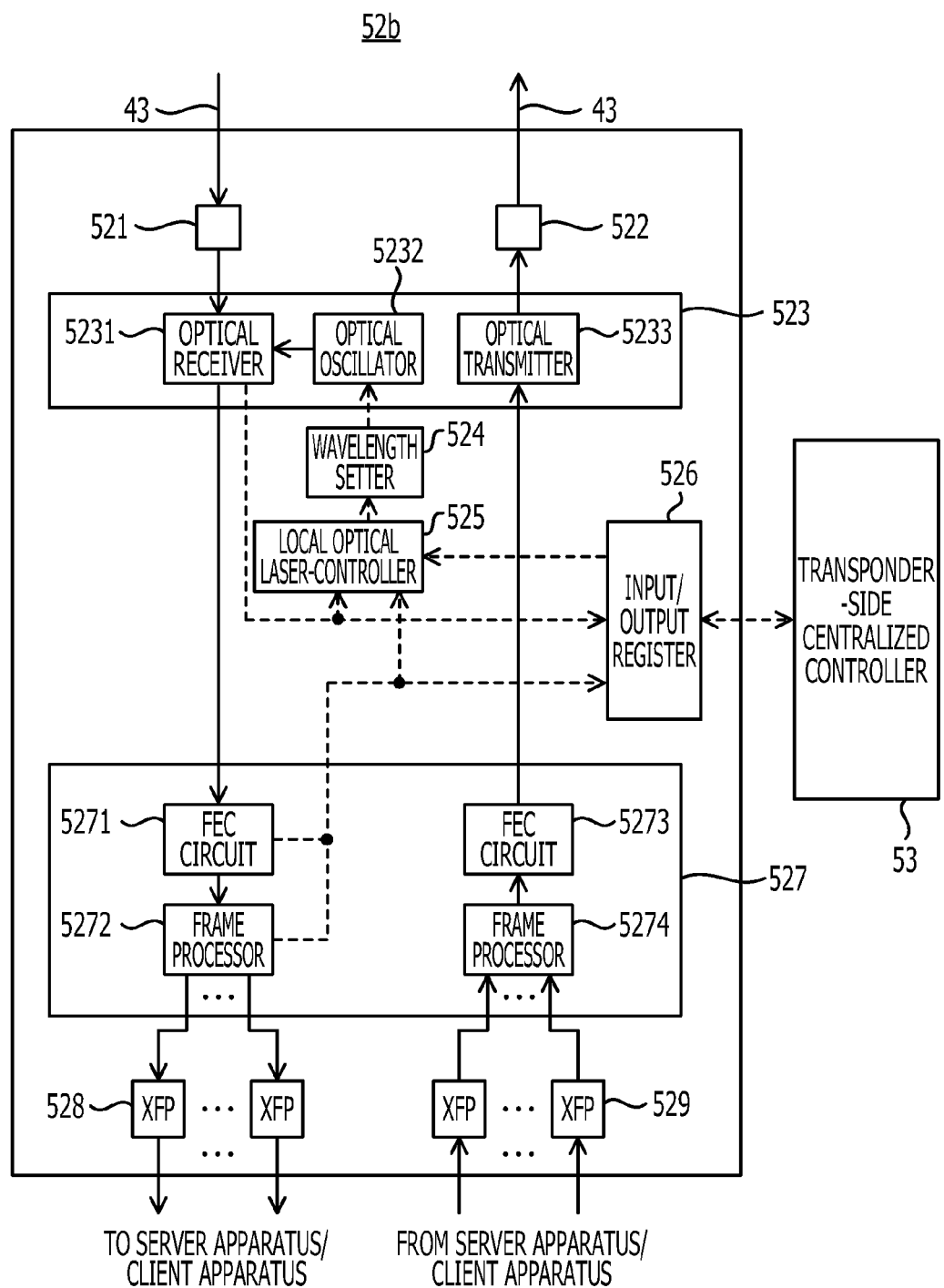
FIG. 10 is a block diagram illustrating an exemplary configuration of an OADM transponder of a second modification.

As illustrated in FIG. 10, an OADM transponder 52b of the second modification is different from the above-described OADM 2 in that a plurality of XFPs 528 and a plurality of XFPs 529 are provided therein. That is, the OADM transponder 52b of the second modification functions as a muxponder.

For example, the OADM transponder 52b of the second modification can separate an optical signal transferred from the OADM core device 3 into a plurality of service signals, and transfer the separated service signals to the client apparatus 7 or the server apparatus 6 through the XFPs 528. More specifically, the OADM transponder 52b can separate an optical with a transmission capacity of 40 G, which is transferred from the OADM core device 3, into four service signals, each having a transmission capacity of 10 G, for example, through operations of the frame processor 5272. In addition, the OADM transponder 52b can transfer the four service signals to the client apparatus 7 or the server apparatus 6 via the plurality of (e.g., four) XFPs 528.

Likewise, the OADM transponder 52b of the second modification can multiplex the service signals that are transferred from the server apparatus 6 or the client apparatus 7, and transfer an optical signal including the multiplexed service signals to the OADM core device 3. More specifically, the OADM transponder 52b can multiplex the service signals, each of which is transferred from the server apparatus 6 or the client apparatus 7 and has a transmission capacity of 10 G, into an optical signal having a transmission capacity of 40 G through operations of the frame processor 5274, and transfer the optical signal to the OADM core device 3.

(3-3) Third Modification

A third modification will be described with reference to FIG. 11. As compared to the above-described transmission system 1 of the present embodiment, an OADM transponder 52c of the third modification is differently configured. Hereinafter, therefore, the third modification will be described regarding the configuration different from that of the above-described transmission system 1 of the present embodiment, and the same configurations as those of the transmission system 1 are designated by the same reference numerals and the detailed descriptions thereof are omitted.

Figure 11:
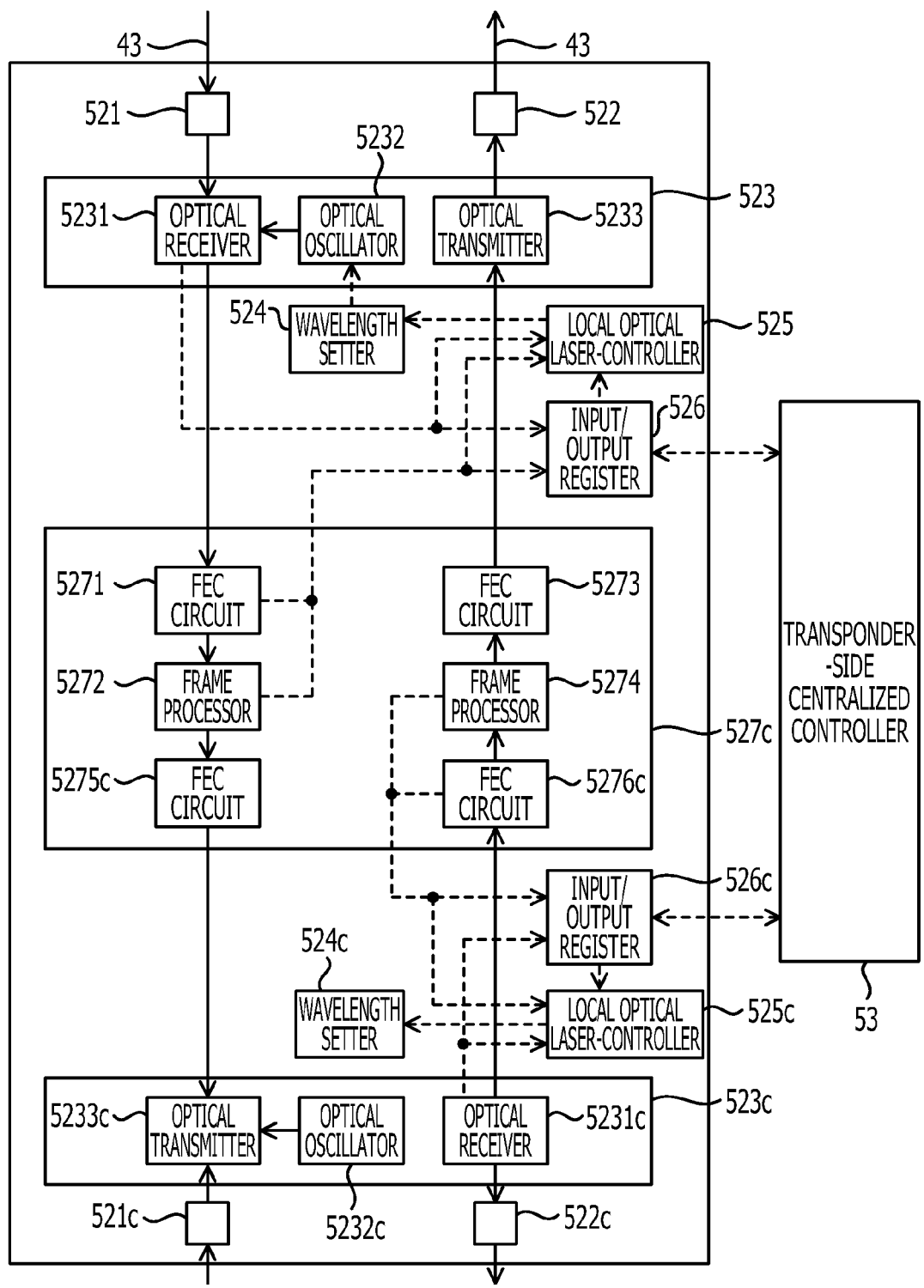
FIG. 11 is a block diagram illustrating an exemplary configuration of an OADM transponder of a third modification.

As compared to the above-described OADM transponder 52, the OADM transponder 52c of the third modification is different in that the OADM transponder 52c includes the configuration similar to the OADM transponder 52 in place of the XFPs 528 and 529 as illustrated in FIG. 11. That is, the OADM transponder 52c has the function of a relay station (namely, a regenerator (REGEN)).

More specifically, a framer LSI 527c of the OADM transponder 52c of the third modification includes FEC circuits 5275c and 5276c in addition to the above-described FEC circuit 5271, frame processor 5272, FEC circuit 5273, and frame processor 5274, as illustrated in FIG. 11. The OADM transponder 52c further includes a transponder-side optical input port 521c, a transponder-side optical output port 522c, an optical transmitter/receiver 523c, a wavelength setter 524c, a local optical laser-controller 525c, and an input/output register 526c. The transponder-side optical input port 521c, the transponder-side optical output port 522c, the optical transmitter/receiver 523c, the wavelength setter 524c, the local optical laser-controller 525c, and the input/output register 526c are configured in the same manner as the above-described transponder-side optical input port 521, transponder-side optical output port 522, optical transmitter/receiver 523, wavelength setter 524, local optical laser-controller 525, and input/output register 526.

The FEC circuit 5275c performs error correction processing on a service signal output from the frame processor 5272, and transfers the service signal to an optical transmitter 5233c provided in the optical transmitter/receiver 523c. Operations that are performed on a signal path extending from the transponder-side optical input port 521 to the frame processor 5272 are substantially the same as those of the above-described OADM transponder 52. The optical transmitter 5233c transfers the service signal transferred from the FEC circuit 5275c as an optical signal via the transponder-side optical output port 522c so that the optical signal is externally transferred from the OADM transponder 52c.

On the other hand, an optical signal which is externally transferred from the OADM transponder 52c via the transponder-side optical input port 521c is received by the optical receiver 5231c of the optical transmitter/receiver 523c. The optical receiver 5231c combines the optical signal input from the transponder-side optical input port 521c and a local optical laser input from the optical oscillator 5232c into a signal, and performs the intradyne detection on the signal so that the optical signal is converted into a service signal. The wavelength of a local optical laser oscillated from the optical oscillator 5232c is set by the wavelength setter 524c and the local optical laser-controller 525c. The service signal converted is transferred to the FEC circuit 5276c. The FEC circuit 5276c performs error correction processing on the transferred service signal, and transfers the service signal to the frame processor 5274. Operations that are performed on a signal path extending from the frame processor 5274 to the transponder-side optical input port 522 are substantially the same as those of the above-described OADM transponder 52.

According to the third modification, the above-described effects are obtained even though the OADM transponder 52 relays an optical signal.

(3-4) Fourth Modification

Figure 12:
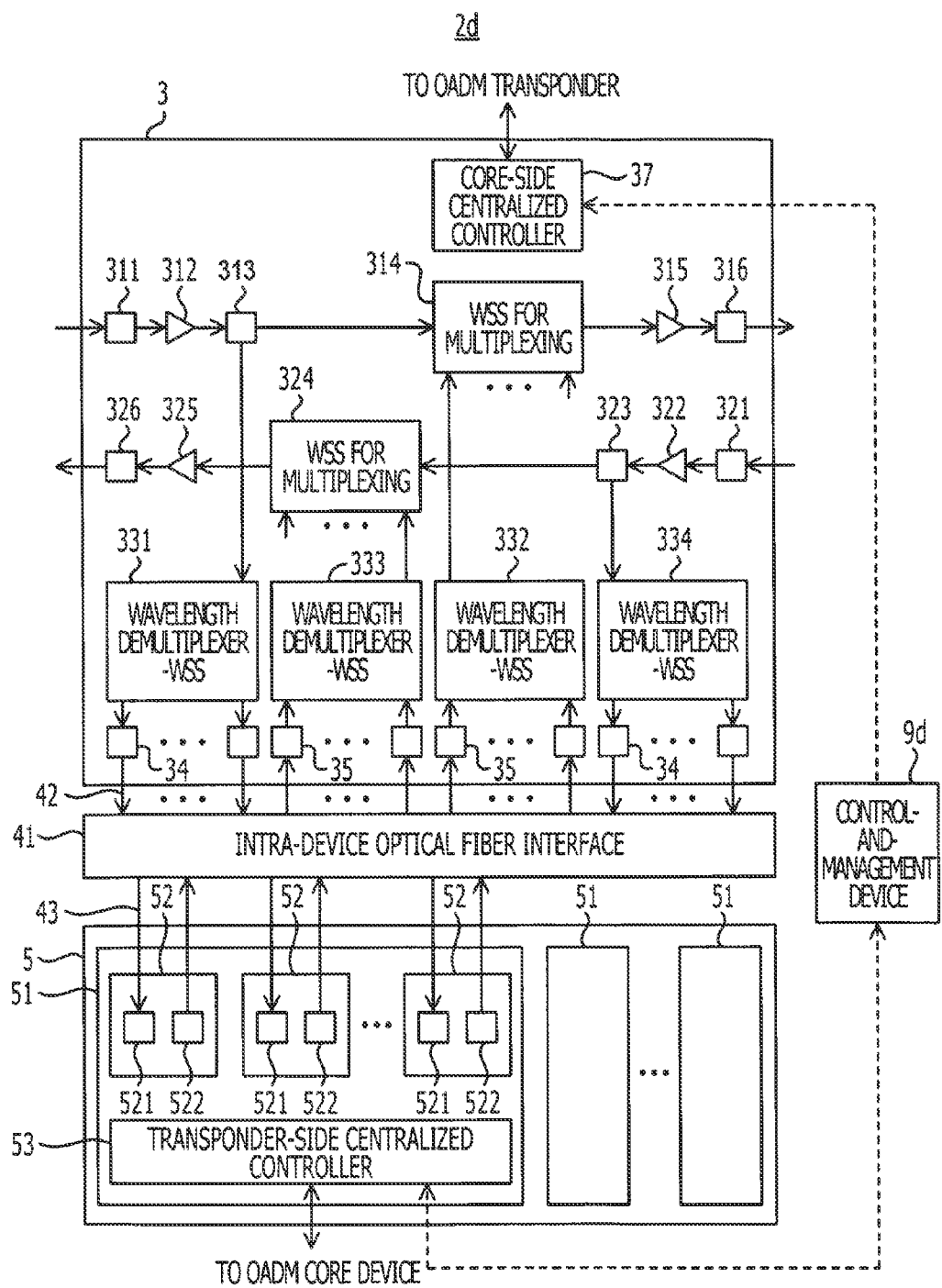
FIG. 12 is a block diagram illustrating an exemplary configuration of an OADM of a fourth modification.

The fourth modification will be described with reference to FIG. 12. An OADM 2d of the fourth modification further includes a control-and-management device 9d in addition to the configuration of the above-described OADM 2 of the present embodiment. The control-and-management device 9d performs the operations that are performed by one or more of the core-side centralized controller 37 and the transponder-side centralized controller 53 (that is, part of or all of the operations that are illustrated in FIGS. 5 to 7). That is, the OADM 2d is different from the above-described OADM 2 in that the control-and-management device 9d is provided independently of the OADM core device 3 and the OADM transponder device 5, to control or manage the operations of the OADM core device 3 and the OADM transponder device 5.

According to the fourth modification, the above-described effects are obtained while reducing the processing loads of the OADM core device 3 and the OADM transponder device 5 (more specifically, the processing loads of the core-side centralized controller 37 and the transponder-side centralized controller 53).

(3-5) Fifth Modification

Figure 13:
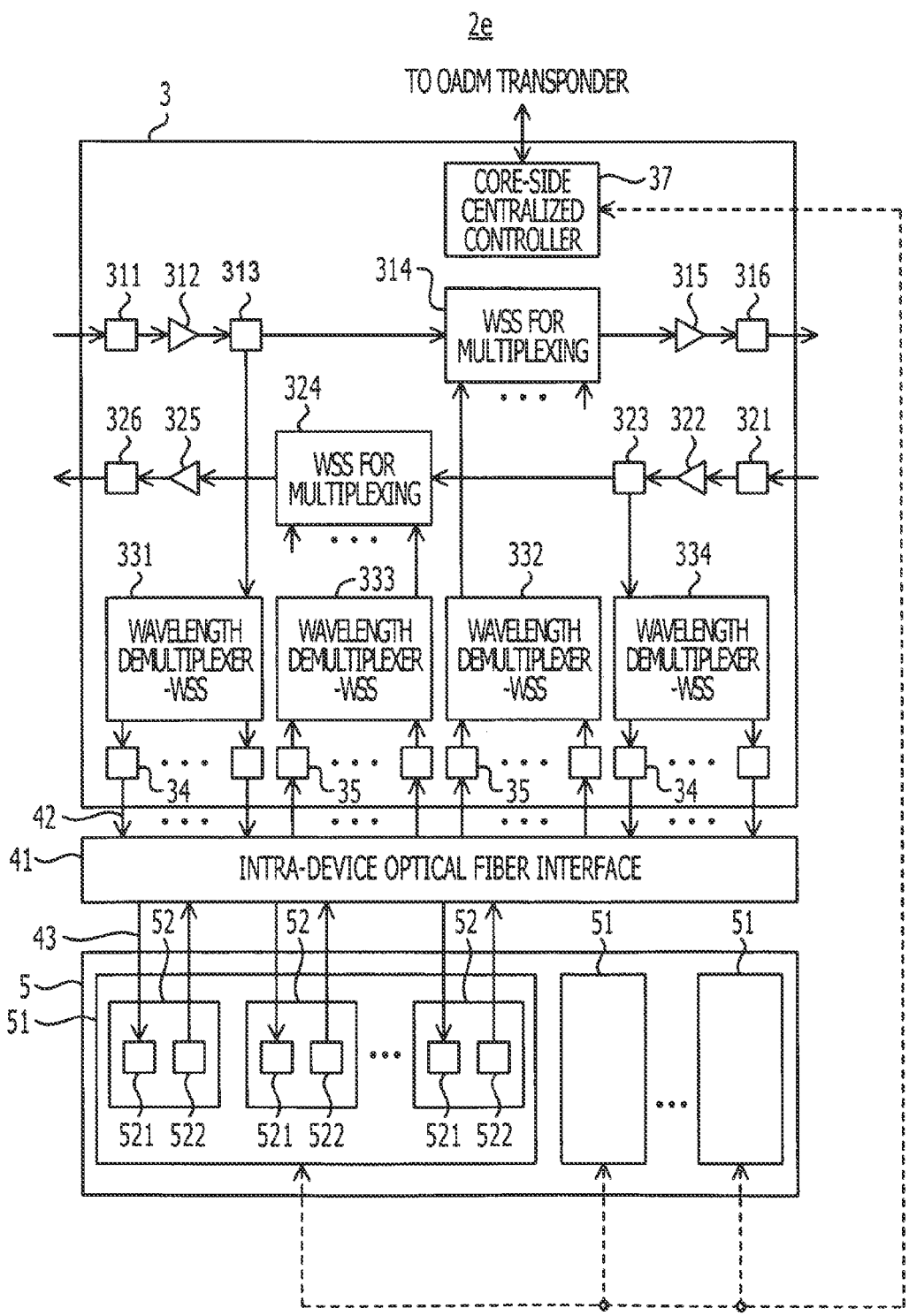
FIG. 13 is a block diagram illustrating an exemplary configuration of an OADM of a fifth modification.

A fifth modification will be described with reference to FIG. 13. As compared to the above-described OADM 2 of the present embodiment, an OADM 2e of the fifth modification is different in that the OADM transponder device 5 does not include the transponder-side centralized controller 53. The other configurations of the OADM 2e may be the same as those of the above-described OADM 2. According to the fifth modification, the operations of the transponder-side centralized controller 53 (that is, part of or all of the operations that are illustrated in FIGS. 5 to 7) are performed by the core-side centralized controller 37.

According to the fifth modification, the above-described various effects are obtained while reducing the processing load, the cost, and so forth of the OADM transponder device 5.

The configurations described in the above-described embodiment and the first to fifth modifications may be used in combination as appropriate, such combination also allowing the above-described various effects to be obtained.

According to an aspect of the embodiments of the invention, any combinations of one or more of the described features, functions, operations, and/or benefits can be provided. The embodiments can be implemented as an apparatus (a machine) that includes hardware for performing the described features, functions, operations, and/or benefits, for example, optical signal technology hardware and hardware to execute instructions, for example, computing hardware (i.e., computing apparatus), such as (in a non-limiting example) any computer or computer processor that can store, retrieve, process and/or output data and/or communicate (network) with other computers. According to an aspect of an embodiment, the described features, functions, operations, and/or benefits can be implemented by and/or use computing hardware and/or software. For example, the local optical laser-controller 525 and transponder-side centralized controller 53 can comprise a computing controller (CPU) (e.g., a hardware logic circuitry based computer processor that processes or executes instructions, namely software/program), computer readable media, transmission communication interface (network interface), and/or an output device, for example, a display device, and which can be in communication among each other through one or more data communication buses. In addition, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A transmission device comprising:
a transponder including
an oscillator configured to oscillate a local optical laser,
a wavelength controller configured to control setting of an oscillation wavelength of the local optical laser to receive an expected input signal light, a coherent receiver configured to combine the local optical laser and input signal light received and output a loss-of-light (LOL) signal when the coherent receiver is unable to receive the input signal light, and a controller configured to determine an erroneous connection of a signal line related to the input signal light by controlling the oscillation wavelength of the local optical laser using a detected wavelength of the input signal light by the coherent receiver, when the LOL signal is not detected by the coherent receiver and a loss-of-signal (LOS) is detected by a signal processing circuit; and a determination circuit configured to provide notification of the erroneous connection of the signal line related to the input signal light.

2. The transmission device according to claim 1, wherein the determination circuit provides expected wavelength information for the input signal light to the transponder.

3. The transmission device according to claim 1, wherein the transponder further includes a signal processing circuit configured to perform signal processing on an electric signal obtained by converting a signal light detected through the detection, and output the loss-of-signal (LOS) signal when the signal processing circuit is unable to perform the signal processing on the electric signal.

4. The transmission device according to claim 3, wherein the transponder further includes a register configured to store expected wavelength information for the input signal light, local optical laser-wavelength history information indicating a wavelength of the local optical laser that has been oscillated from the oscillator, unconnectable wavelength information indicating wavelengths of the input signal light which have not been detected by the coherent receiver, wherein the controller controls the oscillation wavelength of the local optical laser so that the oscillation wavelength becomes the expected wavelength indicated by the expected wavelength information, wherein when the LOL signal is not detected and the LOS signal is detected after the wavelength controller controls the oscillation wavelength of the local optical laser so that the oscillation wavelength becomes the expected wavelength, the controller controls the oscillation wavelength so that the oscillation wavelength becomes one of wavelengths indicated by the unconnectable wavelength information and other than wavelengths included in the local optical laser-wavelength history information, and wherein when the LOS signal is not detected after the controller controls the oscillation wavelength so that the oscillation wavelength becomes the one wavelength, the controller determines an erroneous connection of the signal line.

5. The transmission device according to claim 3, wherein the signal processing circuit stops outputting the LOS signal when the signal processing circuit is able to perform the signal processing on the electric signal after the oscillation wavelength of the local optical laser is changed from the expected wavelength.

6. A control device for controlling a transmission device including a transponder that includes an oscillator configured to oscillate a local optical laser, a wavelength controller configured to control setting of an oscillation wavelength of the local optical laser to receive an expected input signal light, and a coherent receiver configured to combine the local optical laser and input signal light received and output a loss-of-light (LOL) signal when the coherent receiver is unable to receive the input signal light, the control device comprising:

a computing controller configured to determine an erroneous connection of a signal line related to the input signal light by controlling the oscillation wavelength of the local optical laser using a detected wavelength of the input signal light by the coherent receiver, when the LOL signal is not detected by the coherent receiver and a loss-of-signal (LOS) is detected by a signal processing circuit.

7. A method of detecting an erroneous detection of a signal line, the method being used for a transmission device including a transponder that includes an oscillator configured to oscillate a local optical laser, a wavelength controller configured to control setting of an oscillation wavelength of the local optical laser to receive an expected input signal light, and a coherent receiver configured to combine the local optical laser and input signal light received and output a loss-of-light (LOL) signal when the coherent receiver is unable to receive the input signal light , the method comprising:

determining, by control of the oscillation wavelength of the local optical laser through the wavelength controller, an erroneous connection of a signal line related to the input signal light using a detected wavelength of the input signal light by the coherent receiver, when the LOL signal is not detected by the coherent receiver and a loss-of-signal (LOS) is detected by a signal processing circuit.

* * * * *